(12) United States Patent
Jung et al.

(10) Patent No.: US 11,743,585 B2
(45) Date of Patent: Aug. 29, 2023

(54) ELECTRONIC APPARATUS INCLUDING CAMERA AND CONTROL METHOD THEREOF

(71) Applicant: Samsung Electronics Co., Ltd., Suwon-si (KR)

(72) Inventors: Kioh Jung, Suwon-si (KR); Dongyoul Park, Suwon-si (KR); Soonkyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/710,030

(22) Filed: Mar. 31, 2022

(65) Prior Publication Data
US 2022/0311940 A1 Sep. 29, 2022

Related U.S. Application Data

(63) Continuation of application No. PCT/KR2022/004177, filed on Mar. 24, 2022.

(30) Foreign Application Priority Data

Mar. 25, 2021 (KR) .................. 10-2021-0038970

(51) Int. Cl.
*H04N 23/68* (2023.01)
*H04N 23/67* (2023.01)

(52) U.S. Cl.
CPC ......... *H04N 23/683* (2023.01); *H04N 23/675* (2023.01); *H04N 23/6812* (2023.01)

(58) Field of Classification Search
CPC .. H04N 23/685; H04N 23/69; H04N 23/6812; H04N 23/683; H04N 23/675; H04N 23/667

(Continued)

(56) References Cited

U.S. PATENT DOCUMENTS 5,794,078 A 8/1998 Okazaki
5,940,630 A 8/1999 Washisu
(Continued)

FOREIGN PATENT DOCUMENTS

JP 2007-128077 A 5/2007
JP 2009-531732 A 9/2009
(Continued)

OTHER PUBLICATIONS

International Search Report and Written Opinion dated Jun. 28, 2022, issued in International Patent Application No. PCT/KR2022/004177.

*Primary Examiner* — Pritham D Prabhakher
(74) *Attorney, Agent, or Firm* — Jefferson IP Law, LLP

(57) ABSTRACT

An electronic apparatus is provided. The electronic apparatus includes at least one camera module including at least one lens, a first sensor configured to detect a motion of the electronic apparatus, and at least one processor configured to perform a first focusing operation of determining a target position of the at least one lens by focusing processing on a subject and moving the at least one lens to the target position, and perform a second focusing operation of, according to a determination that a first condition that a photographing distance, which is a distance to the subject, is less than a distance reference value and a depth-of-field value is less than or equal to a depth reference value is satisfied, additionally driving the at least one lens based on a calculated focusing correction value for compensating a motion.

18 Claims, 17 Drawing Sheets

(58) Field of Classification Search
USPC .................................................. 348/208.4
See application file for complete search history.

(56) References Cited

U.S. PATENT DOCUMENTS

| | | | |
|---|---|---|---|
| 7,409,149 B2 | 8/2008 | Spielberg | |
| 7,415,199 B2 | 8/2008 | Wernersson | |
| 7,627,240 B2 | 12/2009 | Nikkanen | |
| 7,835,636 B2 | 11/2010 | Yuyama | |
| 8,767,079 B2 | 7/2014 | Yamazaki | |
| 8,811,809 B2 | 8/2014 | Miyazawa | |
| 9,083,878 B2* | 7/2015 | Kikuchi | G03B 13/36 |
| 9,628,695 B2* | 4/2017 | Somanath | H04N 13/25 |
| 9,883,108 B2 | 1/2018 | Wada | |
| 10,419,658 B1* | 9/2019 | Haynold | H04N 23/64 |
| 10,893,188 B2 | 1/2021 | Tokioka et al. | |
| 11,350,024 B1* | 5/2022 | Stallman | H04N 23/64 |
| 2004/0057613 A1* | 3/2004 | Noto | G06T 7/586 |
| | | | 382/154 |
| 2007/0031136 A1* | 2/2007 | Kakkori | H04N 23/959 |
| | | | 396/89 |
| 2007/0098380 A1* | 5/2007 | Spielberg | H04N 23/671 |
| | | | 396/125 |
| 2007/0223905 A1* | 9/2007 | Nikkanen | G02B 7/287 |
| | | | 396/130 |
| 2008/0226274 A1* | 9/2008 | Spielberg | H04N 23/6812 |
| | | | 396/50 |
| 2014/0258167 A1* | 9/2014 | Rohmann | G06Q 10/08345 |
| | | | 705/335 |
| 2017/0289439 A1* | 10/2017 | Miyazawa | G03B 13/36 |
| 2019/0238756 A1* | 8/2019 | Tokioka | H04N 23/672 |

FOREIGN PATENT DOCUMENTS

| | | |
|---|---|---|
| JP | 2011-217311 A | 10/2011 |
| JP | 2019-133026 A | 8/2019 |
| JP | 6737307 B2 | 8/2020 |
| KR | 10-0989229 B1 | 10/2010 |
| KR | 10-2013-0072136 A | 7/2013 |

* cited by examiner

<COMPARISON BETWEEN DEPTHS OF FIELD AT CLOSEST PHOTOGRAPHING DISTANCE>

| ITEMS | WIDE-ANGLE CAMERA MODULE | ULTRA-WIDE-ANGLE CAMERA MODULE |
|---|---|---|
| VIEWING ANGLE FOV [Degree] | 83 | 120 |
| CLOSEST PHOTOGRAPHING DISTANCE [mm] | 100 | 50 |
| DEPTH OF FIELD [mm] | 1.2 | 5.9 |

ELECTRONIC APPARATUS INCLUDING CAMERA AND CONTROL METHOD THEREOF

CROSS-REFERENCE TO RELATED APPLICATION(S)

This application is a continuation application, claiming priority under § 365(c), of an International application No. PCT/KR2022/004177, filed on Mar. 24, 2022, which is based on and claims the benefit of a Korean patent application number 10-2021-0038970, filed on Mar. 25, 2021, in the Korean Intellectual Property Office, the disclosure of which is incorporated by reference herein in its entirety.

TECHNICAL FIELD

The disclosure relates to an electronic apparatus including a camera, a control method of the electronic apparatus, and a computer-readable recording medium having recorded thereon a program for performing the control method of the electronic apparatus.

BACKGROUND ART

Recently, wide-angle cameras have been widely applied to various mobile devices. Wide-angle photographing is used in close-up photographing for photographing a subject at a close distance. As close-up photographing for photographing in a state of focusing on a subject at a close distance without focusing on a background is widely used, there is a demand for high-quality wide-angle photographing in a mobile device.

Moreover, in many cases, a camera module of a mobile device provides advanced functions such as auto-focusing and hand vibration prevention. When an electronic apparatus photographs a subject, an image is obtained by performing an exposure period immediately after auto-focusing. However, because a depth of field decreases as a wide angle increases, an unfocused picture is taken because the subject deviates from the depth of field after exposure in wide-angle photographing.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic apparatus capable of improving a photographing quality in close-up photographing, a control method of the electronic apparatus, and a computer-readable recording medium storing a program thereof.

Another aspect of the disclosure is to provide an electronic apparatus capable of correcting a hand vibration in an optical-axis direction by tracking a motion in the optical-axis direction of the electronic apparatus, a control method of the electronic apparatus, and a computer-readable recording medium storing a program thereof.

Additional aspects will be set forth in part in the description which follows and, in part, will be apparent from the description, or may be learned by practice of the presented embodiments.

Solution to Problem

In accordance with an aspect of the disclosure, an electronic apparatus is provided. The electronic apparatus includes at least one camera module including at least one lens, a first sensor configured to detect a motion of the electronic apparatus, and at least one processor configured to perform a first focusing operation of determining a target position of the at least one lens by focusing processing on a subject and moving the at least one lens to the target position, and perform a second focusing operation of, according to a determination that a first condition that a photographing distance, which is a distance to the subject, is less than a distance reference value and a depth-of-field value is less than or equal to a depth reference value is satisfied, calculating a motion value in an optical-axis direction from a detection value of the first sensor, calculating a focusing correction value for compensating for the motion value in the optical-axis direction, and additionally driving the at least one lens based on the focusing correction value.

Also, according to an embodiment of the disclosure, the at least one processor may be configured to operate in a first mode of activating the second focusing operation, based on the determination that the first condition is satisfied, and operate in a second mode of not performing the second focusing operation, based on a determination that the first condition is not satisfied.

Also, according to an embodiment of the disclosure, a drivable range of the at least one lens by the second focusing operation may be narrower than a drivable range of the at least one lens by the first focusing operation.

Also, according to an embodiment of the disclosure, the at least one processor may be configured to measure a photographing distance to the subject based on image data generated by the at least one camera module.

Also, according to an embodiment of the disclosure, the electronic apparatus may further include a second sensor configured to measure a distance to the subject, wherein the at least one processor may be configured to measure a distance to the subject based on a detection value of the second sensor.

Also, according to an embodiment of the disclosure, the at least one camera module may include a wide-angle camera module and a telephoto camera module including a lens with a greater focal length than the wide-angle camera module, and the at least one processor may be configured to, when the wide-angle camera module is used, determine whether the first condition is satisfied and perform the second focusing operation based on the determination that the first condition is satisfied.

Also, according to an embodiment of the disclosure, the at least one camera module may include at least one vibration correction lens and at least one focus lens for adjusting a focal length, and the at least one processor may be configured to detect a motion in an angular-speed direction from the first sensor and drive the at least one vibration correction lens to compensate for a motion value in the angular-speed direction, and drive the at least one focus lens by performing the first focusing operation and the second focusing operation.

Also, according to an embodiment of the disclosure, the at least one processor may be configured to detect a motion in an angular-speed direction from the first sensor and perform hand vibration correction processing on an image generated by the at least one camera module to compensate for a motion value in the angular-speed direction.

Also, according to an embodiment of the disclosure, the at least one processor may include: a first processor configured to perform the first focusing operation, and a second processor configured to perform the second focusing operation, wherein the at least one processor may be configured to determine whether the first condition is satisfied and activate the second focusing operation of the second processor when it is determined that the first condition is satisfied.

Also, according to an embodiment of the disclosure, the first sensor may include a 6-axis acceleration sensor, and the second processor may be configured to calculate the motion value in the optical-axis direction by quadratically integrating an acceleration value in the optical-axis direction among detection values of the first sensor, calculate the focusing correction value to compensate for the motion value in the optical-axis direction, and perform the second focusing operation.

Also, according to an embodiment of the disclosure, the distance reference value may be 100 mm and the depth reference value may be 8 mm.

Also, according to an embodiment of the disclosure, the at least one processor may be configured to complete the first focusing operation before an exposure period after inputting a shutter release signal of the at least one camera module and perform the second focusing operation during the exposure period.

Also, according to an embodiment of the disclosure, the electronic apparatus may further comprise optical image stabilization micro controller unit (OIS MCU).

Also, according to an embodiment of the disclosure, the OIS MCU may be configured to track a motion value in a z-axis direction during a period of generating a preview image and an exposure period after a shutter release signal is input.

In accordance with another aspect of the disclosure, a control method of an electronic apparatus including at least one camera module is provided. The control method includes detecting a motion of the electronic apparatus by using a first sensor, performing a first focusing operation of determining a target position of at least one lens by focusing processing on a subject and moving the at least one lens to the target position, and performing a second focusing operation of, according to a determination that a first condition that a photographing distance, which is a distance to the subject, is less than a distance reference value and a depth-of-field value is less than or equal to a depth reference value is satisfied, calculating a motion value in an optical-axis direction from a detection value of the first sensor, calculating a focusing correction value for compensating for the motion value in the optical-axis direction, and additionally driving the at least one lens based on the focusing correction value.

In accordance with another aspect of the disclosure, a computer-readable recording medium has recorded thereon a program for performing the above control method of the electronic apparatus in a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
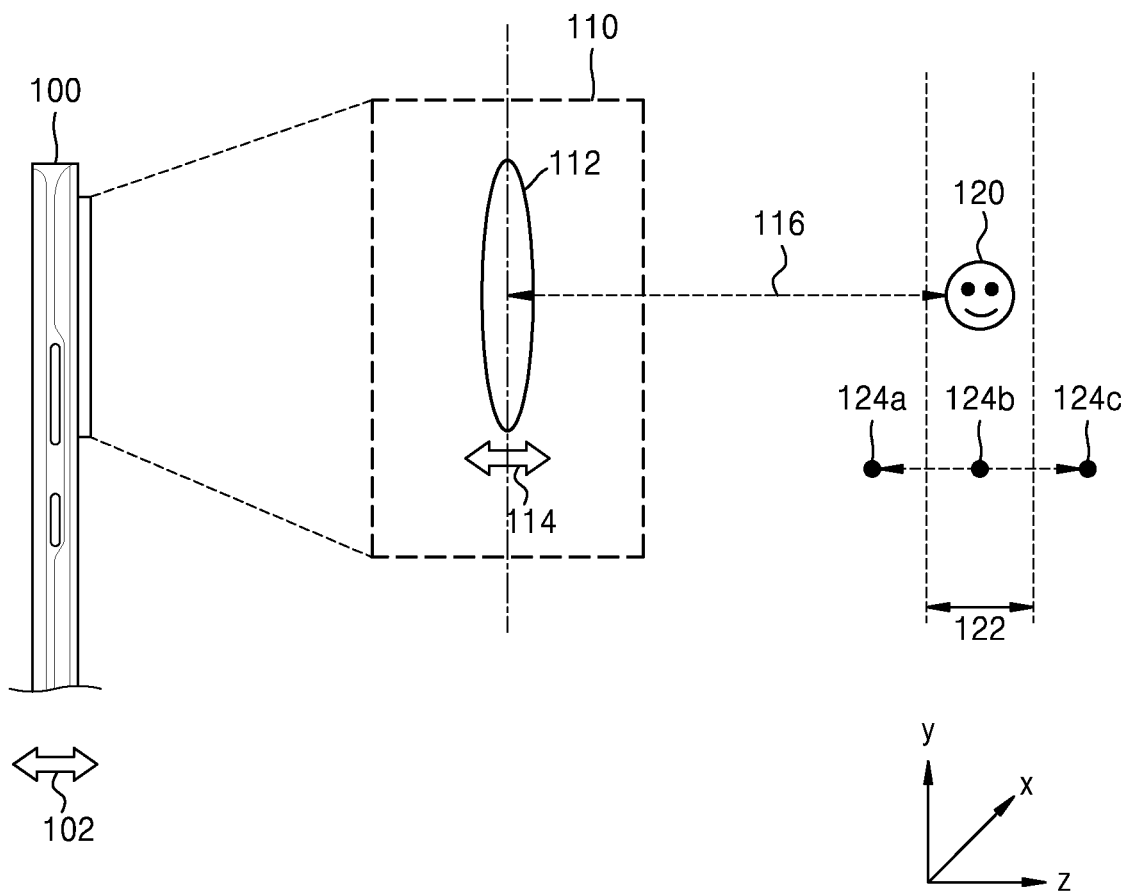
FIG. 1 is a diagram for describing an operation of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

Throughout the disclosure, the expression "at least one of a, b or c" indicates only a, only b, only c, both a and b, both a and c, both b and c, all of a, b, and c, or variations thereof.

Throughout the specification, like reference numerals may denote like elements. The specification may not describe all elements of the embodiments, and general descriptions in the field to which the embodiments of the disclosure pertain or redundant descriptions between the embodiments will be omitted for conciseness. As used herein, the term "module" or "unit" may be implemented by software, hardware, firmware, or any combination thereof, and according to embodiments of the disclosure, a plurality of "modules" or "units" may be implemented as one element or one "module" or "unit" may include a plurality of elements.

In the following description of the embodiments, detailed descriptions of the related art will be omitted when it is deemed that they may unnecessarily obscure the subject matters of the disclosure. Also, numbers (e.g., first and second) used in the process of describing embodiments of the disclosure are merely identification symbols for distinguishing an element from another element.

Also, herein, when an element is referred to as being "connected" or "coupled" to another element, the element may be directly connected or coupled to the other element or may also be indirectly connected or coupled to the other element through one or more other intervening elements therebetween unless otherwise specified.

FIG. 1 is a diagram for describing an operation of an electronic apparatus according to an embodiment of the disclosure.

Referring to FIG. 1, close-up photographing is used to photograph a subject 120 within a certain distance from a camera module 110 of an electronic apparatus 100. In this case, the subject 120 within a depth of field 122 may be photographed in a focused state, and an object outside the depth of field 122 may be photographed in an unfocused state. Thus, the object outside the depth of field 122 may appear in a blurred state because it is out of focus in an obtained image.

In close-up photographing, this phenomenon may be used to focus on an object of interest to the user and intentionally obtain an out-focusing effect on a background other than the object of interest. However, when the object of interest to the user deviates from the depth of field, the object of interest to the user may also be out of focus and a blurring effect may occur, thus degrading the quality of an obtained image.

However, in close-up photographing, the depth of field 122 may be very shallow. According to an embodiment of the disclosure, the depth of field may be only 5.9 mm in the case of wide-angle photographing with a viewing angle Field of View (FOV) of 83 degrees and a photographing distance of 50 mm, and the depth of field may be only 1.2 mm in the case of ultra-wide-angle photographing with a viewing angle FOV of 120 degrees and a photographing distance of 100 mm. As such, in close-up photographing, because the depth of field 122 is only several millimeters, the subject 120 may easily deviate from the depth of field 122 even by a minute vibration in photographing.

For example, in a state where the center of the subject 120 is located at a position 124b, when the central position of the subject 120 with respect to the electronic apparatus 100 moves to a position 124a or a position 124c due to a vibration 102 in the optical-axis direction of the electronic apparatus 100, the subject 120 may deviate from the range of the depth of field 122. The vibration 102 in the optical-axis direction may mean that the distance between the electronic apparatus 100 and the subject 120 is changed. For example, the distance between the electronic apparatus 100 and the subject 120 may be changed as the position of the electronic apparatus 100 changes or the position of the subject 120 changes. The vibration 102 in the optical-axis direction of the electronic apparatus 100, which causes a change in the position of the electronic apparatus 100, may be caused by various factors such as a hand vibration of the user and a vibration of the electronic apparatus 100 when a shutter release signal is input.

In embodiments of the disclosure, in close-up photographing, a focus lens 112 may be additionally driven (114) to correct the vibration 102 in the optical-axis direction of the electronic apparatus 100. The electronic apparatus 100 may detect the vibration 102 in the optical-axis direction by using a certain sensor, calculate a value of the vibration 102 in the optical-axis direction, and then calculate a focusing correction value for the focus lens 112 to compensate for the calculated value of the vibration 102 in the optical-axis direction. The electronic apparatus 100 may perform a first focusing operation of moving the focus lens 112 to a target position to focus on the subject 120, and according to embodiments of the disclosure, in close-up photographing, the electronic apparatus 100 may perform a second focusing operation of additionally driving the focus lens 112 after the first focusing operation to correct the vibration 102 in the optical-axis direction. By the second focusing operation, embodiments of the disclosure may prevent the subject 120 from deviating from the range of the depth of field 122 in close-up photographing, thus remarkably improving the photographing quality of the close-up photographing.

The photographing distance 116 may represent the distance from the central axis of the focus lens 112 to the subject 120. The central axis of the focus lens 112 may represent a certain axis that is located on the central plane of the focus lens 112 including the x axis and the y axis and passes through the center of the focus lens 112. Here, the photographing distance 116 may represent the shortest distance to the subject 120. A motion in the optical-axis direction may represent a motion component in a direction corresponding to the optical axis of the camera module 110. Herein, the optical axis will be referred to as the z axis.

According to an embodiment of the disclosure, the photographing distance 116 may also be defined as the distance from an image sensor to the subject 120. When the photographing distance 116 is defined as the distance from the image sensor to the subject 120, driving parameters may be set according to the definition.

Figure 2:
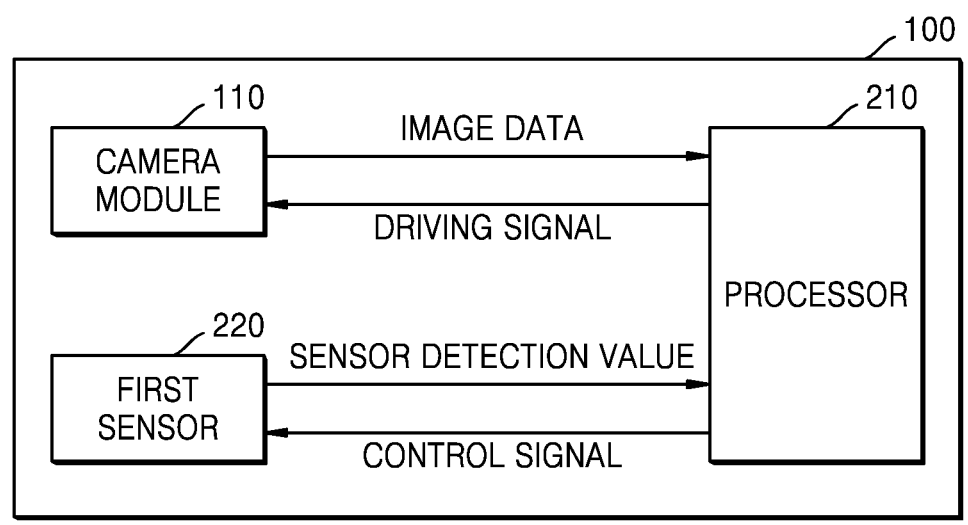
FIG. 2 is a diagram illustrating a structure of an electronic apparatus according to an embodiment of the disclosure.

FIG. 2 is a diagram illustrating a structure of an electronic apparatus according to an embodiment of the disclosure.

Referring to FIG. 2, according to an embodiment of the disclosure, an electronic apparatus 100 may include various types of electronic apparatuses 100 including a camera module 110. For example, the electronic apparatus 100 may be implemented in various forms such as a communication apparatus, a wearable apparatus, a camera, a tablet personal computer (PC), and a laptop PC. According to an embodiment of the disclosure, the electronic apparatus 100 may be implemented in the form of a foldable electronic apparatus or a rollable electronic apparatus.

The electronic apparatus 100 may include a camera module 110, a processor 210, and a first sensor 220.

The camera module 110 may photoelectrically convert incident light to generate image data. The camera module 110 may include at least one lens, an image sensor, and a driving circuit. According to an embodiment of the disclosure, the camera module 110 may further include an optical device such as an aperture or a shutter. The at least one lens may include a focus lens. For example, the image sensor may be implemented by using a charged coupled device (CCD) sensor or a complementary metal oxide semiconductor (CMOS) sensor. The camera module 110 may include one or more camera modules. For example, the camera module 110 may include at least one of an ultra-wide-angle camera module, a wide-angle camera module, or a telephoto camera module or any combination thereof. According to another embodiment, the camera module 110 may be implemented as a single camera module 110, and a focal length and a wide angle may be adjusted by using at least one lens assembly in the camera module 110.

The camera module 110 may output the generated image data to the processor 210.

The processor 210 may control an overall operation of the electronic apparatus 100. The processor 210 may include one or more processors. The processor 210 may include, for example, a mobile application processor (AP) and an auxiliary processor for performing hand vibration correction (i.e., image stabilization) processing.

The processor 210 may receive the image data from the camera module 110 and generate an obtained image. The processor 210 may generate an obtained image corresponding to a still image or a moving image by performing various image processing and compression processing on the image data. The processor 210 may generate a preview image, a screenshot image, a capture image, or a moving image from the image data.

The processor 210 may generate a driving signal for driving the camera module 110 and output the driving signal to the camera module 110. The camera module 110 may be driven based on the driving signal generated and output by the processor 210. The camera module 110 may drive the focus lens in the z-axis direction based on the driving signal. The processor 210 may determine a target position of the focus lens through focusing processing and generate and output a driving signal corresponding to the target position. The focusing processing may include auto-focusing (AF) processing in which the processor 210 automatically performs focusing processing based on image data or a detection value of a certain sensor or manual focusing processing in which the user manually adjusts the position of a lens. The processor 210 may perform focusing processing according to a focusing mode (an auto-focusing mode or a manual focusing mode) and generate a driving signal for the focus lens. In addition to a signal for driving the focus lens, the driving signal may include an image sensor driving signal, a shutter release signal, a flash driving signal, a camera module activation signal, or the like. A first focusing operation of driving the lens of the camera module 110 may be performed according to the driving signal by the focusing processing.

The first sensor 220 may be a sensor for detecting the motion of the electronic apparatus 100. The first sensor 220 may include, for example, an acceleration sensor or a gyro sensor. Also, according to an embodiment of the disclosure, the first sensor 220 may correspond to a 6-axis sensor. The 6-axis sensor may be a sensor for detecting an angular speed on 3 axes and acceleration on 3 axes. The angular speed on 3 axes may include angular speeds in the yaw, pitch, and roll directions. The acceleration on 3 axes may include accelerations in the x-axis, y-axis, and z-axis directions. The first sensor 220 may output the detected 3-axis angular speed values and 3-axis acceleration values as sensor detection values to the processor 210.

In order to determine whether photographing is close-up photographing, the processor 210 may determine whether a first condition is satisfied. The first condition is that the photographing distance, which is the distance from the image sensor to the subject, is less than a distance reference value and the depth-of-field value is less than or equal to a depth reference value. For example, the distance reference value may be set to 100 mm, and the depth reference value may be set to 8 mm. The distance reference value and the depth reference value may be set or changed by a user input.

When it is determined that the first condition is satisfied, the processor 210 may operate in a first mode of performing a second focusing operation. In the first mode, the electronic apparatus 100 may perform a second focusing operation after completion of a first focusing operation. The first focusing operation may be performed whenever the focusing target position of the focus lens is changed by the focusing processing. The second focusing operation may track a motion in the z-axis direction after completion of the first focusing operation and may be performed during a preview period and an exposure period. The exposure period may be a period in which the image sensor is exposed for a certain exposure time after the shutter release signal is input.

When it is determined that the first condition is not satisfied, the processor 210 may operate in a second mode of not performing the second focusing operation. In the second mode, the electronic apparatus 100 may perform the first focusing operation and may not perform processing for tracking the motion in the z-axis direction.

The drivable range of the first focusing operation may be greater than the drivable range of the second focusing operation. Because the first focusing operation is for focusing on the subject and the second focusing operation is a fine correction operation for correcting a vibration after completion of the first focusing operation, the drivable range of the second focusing operation may be set shorter than the drivable range of the first focusing operation. When the motion value in the optical-axis direction of the electronic apparatus 100 deviates from the range that may be corrected by the second focusing operation, the electronic apparatus 100 may perform the first focusing operation again.

In the first mode, the processor 210 may calculate a motion value in the optical-axis direction from the detection value of the first sensor 220 to perform the second focusing operation. The processor 210 may generate a motion value of the electronic apparatus 100 based on the sensor detection value output from the first sensor 220. The processor 210 may calculate a motion value in the optical-axis direction, that is, the z-axis direction, based on the acceleration in the z-axis direction of the first sensor 220. The processor 210 may calculate a motion value in the z-axis direction by performing an integration operation on the acceleration. The processor 210 may track the motion value in the z-axis direction from the detection value of the first sensor 220. The processor 210 may track the motion value in the z-axis direction in a period of operating in the preview mode and an exposure period.

The processor 210 may calculate a focusing correction value for compensating for the motion in the z-axis direction, based on the motion value in the z-axis direction. The processor 210 may calculate a focusing correction value for offsetting the motion value in the z-axis direction to compensate for the motion value in the z-axis direction. When there is a motion in the z-axis direction of the electronic apparatus 100, a change according to the motion in the z-axis direction may appear in an obtained image. Particularly, when the subject deviates from the depth of field due to the motion in the z-axis direction, the subject may be photographed in an unfocused blurry state, thus degrading the quality of an obtained image. The processor 210 may generate a focusing correction value for moving the focus lens in the z-axis direction in order to offset the motion in the z-axis direction and keep the subject within the range of the depth of field. The focusing correction value may represent the movement direction and the movement amount of the focus lens 112. The processor 210 may generate a focusing correction value, generate a lens driving signal corresponding to the focusing correction value, and output the driving signal to the camera module 110.

The camera module 110 may drive the focus lens 112 in the camera module 110 based on the driving signal input from the processor 210. According to an embodiment of the disclosure, the camera module 110 may perform the first focusing operation and the second focusing operation in the first mode and may perform the first focusing operation in the second mode. The driving circuit of the camera module 110 may control at least one lens and an image sensor based on the driving signal input from the processor 210. The camera module 110 may move the focus lens to the focusing target position based on the driving signal and may move the focus lens in the z-axis direction according to the focusing correction value.

Figure 3:
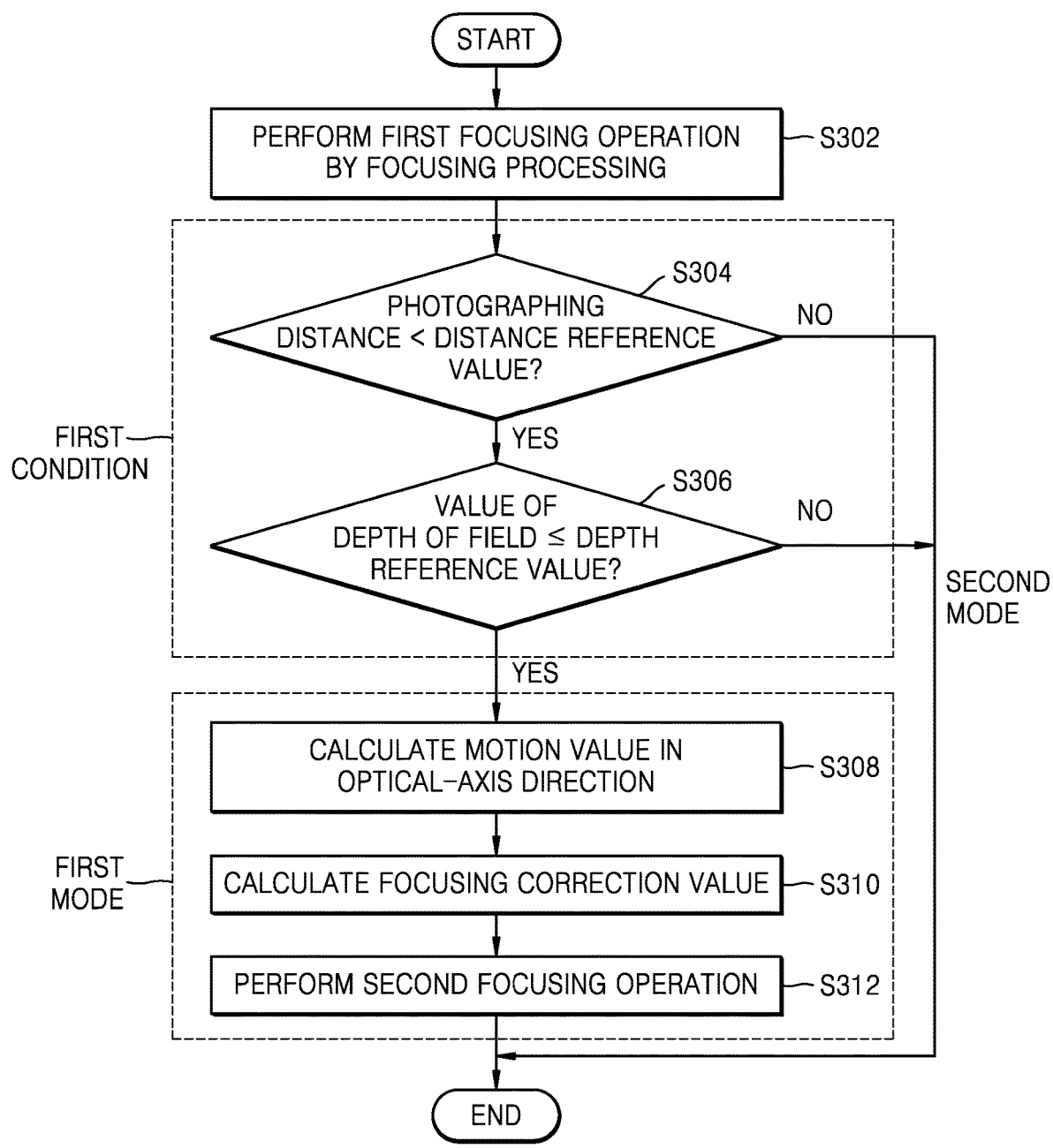
FIG. 3 is a flowchart illustrating a control method of an electronic apparatus according to an embodiment of the disclosure.

FIG. 3 is a flowchart illustrating a control method of an electronic apparatus according to an embodiment of the disclosure.

A control method of an electronic apparatus according to an embodiment of the disclosure may be performed by various electronic apparatuses including a camera module, a motion detecting sensor, and a processor. The disclosure will focus on an embodiment in which the electronic apparatus 100 according to embodiments of the disclosure performs the control method of the electronic apparatus. The control method of the electronic apparatus according to the described embodiments is not limited to being performed by the electronic apparatus 100 described herein and may be performed by various types of electronic apparatuses.

Referring to FIG. 3, at operation S302, an electronic apparatus may perform focusing processing and perform a first focusing operation based on a result value of the focusing processing. According to an embodiment of the disclosure, the focusing processing may be performed based on the image data input through the camera module. According to another embodiment, the focusing processing may be performed based on a detection value of a sensor such as a distance sensor or a phase difference sensor. The result value of the focusing processing may be the target position of the lens.

The electronic apparatus may perform the first focusing operation by moving the focus lens to the target position of the lens. For this purpose, the processor of the electronic apparatus may generate a driving signal for driving the focus lens and output the driving signal to the camera module, and the camera module may drive the focus lens based on the driving signal.

Next, at operations S304 and S306, the electronic apparatus may determine whether the photographing distance value and the depth-of-field value satisfy the first condition. The first condition is that the photographing distance value is less than the distance reference value and the depth-of-field value is less than or equal to the depth reference value. The electronic apparatus may detect or calculate and obtain the photographing distance value and the depth-of-field value.

At operation S304, the electronic apparatus may determine whether the photographing distance is less than the distance reference value. At operation S306, the electronic apparatus may determine whether the depth-of-field value is equal to or less than the depth reference value. The order of operations S304 and S306 may be changed according to embodiments and may be performed in parallel.

According to an embodiment of the disclosure, when a lens with a shallow depth of field (e.g., a wide-angle lens or a bright lens) is selected, the electronic apparatus may determine whether the photographing distance is less than the reference distance value. In this case, the electronic apparatus may first determine whether a lens with a shallow depth of field is selected at operation S306 and may determine whether the photographing distance is less than the distance reference value at operation S304 when a lens with a shallow depth of field is selected.

When it is determined that the first condition is satisfied, the electronic apparatus may operate in the first mode of additionally performing the second focusing operation after performing the first focusing operation. When it is determined that the first condition is not satisfied, the electronic apparatus may operate in the second mode of performing the first focusing operation and not performing the second focusing operation.

When the electronic apparatus operates in the first mode, operations S308, S310, and S312 may be performed.

At operation S308, the electronic apparatus may calculate a motion value of the electronic apparatus in the optical-axis direction. The electronic apparatus may detect a motion of the electronic apparatus by using various types of motion sensors. According to an embodiment of the disclosure, the electronic apparatus may use a 6-axis acceleration sensor. The electronic apparatus may calculate a motion value in the optical-axis direction by integrating the acceleration in the optical-axis direction in the 6-axis acceleration sensor. However, because the detected value of the motion sensor may be used in an operation other than the second focusing operation, even when the electronic apparatus operates in the second mode, processing for calculating a motion value for an operation other than the second focusing operation may be performed.

Next, at operation S310, the electronic apparatus may calculate a focusing correction value based on the motion value in the optical-axis direction. The electronic apparatus may calculate a focusing correction value for compensating for the motion in the optical-axis direction of the electronic apparatus. The electronic apparatus may calculate the movement amount and the movement direction of the focus lens for offsetting the influence of the motion in the optical-axis direction in the obtained image and calculate a focusing correction value representing the movement amount and the movement direction of the focus lens. The electronic apparatus may generate a driving signal for driving the focus lens, by using the focusing correction value.

At operation S312, the electronic apparatus may perform the second focusing operation by driving the focus lens. The electronic apparatus may drive the focus lens of the camera module based on the driving signal generated based on the focusing correction value.

According to an embodiment of the disclosure, whether the first condition is satisfied may be determined whenever the photographing distance is changed. The photographing distance may be obtained based on the result value of the first focusing operation or may be obtained by using a separate second sensor. When the photographing distance is changed, the electronic apparatus may perform the first focusing operation of S302 and may perform an operation of determining whether the first condition of S304 and S306 is satisfied. When it is determined that the electronic apparatus operates in the first mode because the first condition is satisfied, the electronic apparatus may track the motion in the optical-axis direction during a period for generating a preview image and an exposure period for capturing an image according to a shutter release signal, calculate the focusing correction value based on the motion value in the optical-axis direction, and perform the second focusing operation. Accordingly, the second focusing operation may be continuously performed by tracking the motion in the optical-axis direction.

According to another embodiment, whether the first condition is satisfied may be determined whenever the first focusing operation is performed. The electronic apparatus may obtain the photographing distance based on the result value of the first focusing operation and determine whether the first condition is satisfied based on the obtained photographing distance. When it is determined that the electronic apparatus operates in the first mode because the first condition is satisfied, the electronic apparatus may track the motion in the optical-axis direction during a period for generating a preview image and an exposure period for capturing an image according to a shutter release signal, calculate the focusing correction value based on the motion value in the optical-axis direction, and perform the second focusing operation. Accordingly, the second focusing operation may be continuously performed by tracking the motion in the optical-axis direction.

When it is determined at operation S304 or S306 that the first condition is not satisfied, the electronic apparatus may operate in the second mode. In the second mode, the electronic apparatus may not additionally perform the second focusing operation after performing the first focusing operation.

Figure 4:
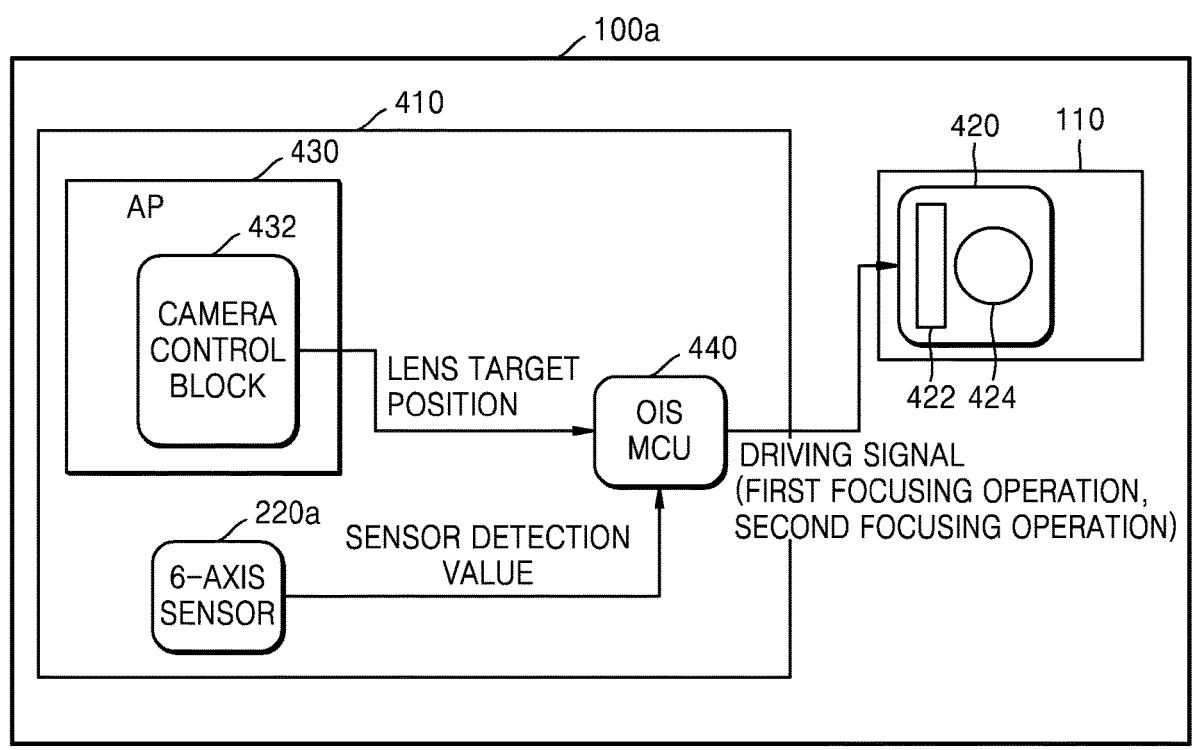
FIG. 4 is a diagram illustrating a structure of an electronic apparatus according to an embodiment of the disclosure.

FIG. 4 is a diagram illustrating a structure of an electronic apparatus according to an embodiment of the disclosure.

Referring to FIG. 4, according to an embodiment of the disclosure, an electronic apparatus 100a may include a circuit block 410 and a camera module 110 including a wide-angle camera module 420. Although FIG. 4 illustrates that the camera module 110 includes only the wide-angle camera module 420, the camera module 110 may further include another camera module such as a telephoto camera module in addition to the wide-angle camera module 420.

The circuit block 410 may include an application processor (AP) 430, an optical image stabilization micro controller unit (OIS MCU) 440, and a 6-axis sensor 220a. Here, the AP 430 and the OIS MCU 440 may correspond to the processor 210 of FIG. 2. The 6-axis sensor 220a may correspond to the first sensor 220 of FIG. 2. Herein, the AP 430 may also be referred to as a first processor, and the OIS MCU 440 may also be referred to as a second processor.

The AP 430 may control an overall operation of the electronic apparatus 100a. The AP 430 may be implemented in the form of a system on chip (SoC) as a chipset including a central processing unit (CPU), a graphics processing unit (GPU), a video processing unit (VPU), a digital signal processor (DSP), a modem, or the like. The AP 430 may include a camera control block 432 for controlling and driving the camera module 110.

The camera control block 432 may perform a camera control operation such as auto-focusing (AF) or auto-exposure. The camera control block 432 may perform an AF operation in the photographing mode of the electronic apparatus 100a. When the electronic apparatus 100a operates in a manual photographing mode, the camera control block 432 may determine a lens target position of the focus lens based on a user input signal input by the user.

The AF operation may include determining the lens target position of the focus lens to focus on the subject in real time when the photographing mode is started. The camera control block 432 may output lens target position information determined by the AF operation to the OIS MCU 440. The AF operation of the camera control block 432 may use various methods such as active AF in which AF is performed by using a distance sensor such as an infrared sensor or a laser sensor or passive AF in which AF is performed based on image data.

According to an embodiment of the disclosure, the electronic apparatus 100a may include a second sensor corresponding to the distance sensor, determine a distance to the subject based on a detection value of the second sensor, and perform an AF operation based on the determined distance to the subject. The electronic apparatus 100a may determine a target position of the focus lens based on the distance to the subject and perform an AF operation based on the determined target position of the focus lens. According to another embodiment, the electronic apparatus 100 may perform an AF operation based on the image data by using a method such as contrast AF.

The 6-axis sensor 220a may be a sensor for detecting an angular speed on 3 axes and acceleration on 3 axes. The angular speed on 3 axes may include angular speeds in the yaw, pitch, and roll directions. The acceleration on 3 axes may include accelerations in the x-axis, y-axis, and z-axis directions. The 6-axis sensor 220a may output the sensor detection values including the 3-axis angular speed value and the 3-axis acceleration value to the OIS MCU 440.

The OIS MCU 440 may generate a driving signal for driving the lens of the camera module 110 based on the lens target position information. The camera module 110 may drive a lens 424 based on the driving signal input from the OIS MCU 440. When the lens target position is input from the camera control block 432 of the AP 430, the OIS MCU 440 may generate a driving signal for the first focusing operation and output the driving signal to the camera module 110. When the driving signal is input, the camera module 110 may drive the lens 424 according to the driving signal.

When the electronic apparatus 100a operates in the first mode, the OIS MCU 440 may generate a driving signal for the second focusing operation. The AP 430 may determine whether to operate in the first mode or the second mode, based on the photographing distance and the depth-of-field value. The AP 430 may output, to the OIS MCU 440, mode information about whether it operates in the first mode or the second mode. When the OIS MCU 440 operates in the first mode based on the mode information input from the AP 430, the OIS MCU 440 may calculate a focusing correction value by using the sensor detection value input from the 6-axis sensor 220*a*. The OIS MCU 440 may generate a focusing correction value for compensating for the motion in the z-axis direction by using the acceleration value in the z-axis direction among the sensor detection values. Also, the OIS MCU 440 may generate a driving signal corresponding to the focusing correction value, output the driving signal to the camera module 110, and perform the second focusing operation. The camera module 110 may receive the driving signal corresponding to the focusing correction value and perform the second focusing operation.

The OIS MCU 440 may track the motion value in the z-axis direction during a period of generating a preview image and an exposure period after the shutter release signal is input. Also, the OIS MCU may update the focusing correction value for compensating for the motion value in the z-axis direction and the corresponding driving signal according to the result of tracking the motion in the z-axis direction. Accordingly, the lens 424 of the camera module 110 may be driven by tracking the motion in the z-axis direction according to the driving signal.

The OIS MCU 440 may receive, from the AP 430, information about a period for generating a preview image and information about an exposure period after the shutter release signal is input. For example, the OIS MCU 440 may receive information corresponding to the preview mode, shutter release signal input information, and information about the exposure time.

As another example, the OIS MCU 440 may receive information about the exposure period from the camera module 110. For example, the OIS MCU 440 may obtain information about the exposure period from readout information or facilitate information of an imaging device 422. The OIS MCU 440 may track the motion value in the z-axis direction during a period in which the imaging device 422 is engaged or a period in which an imaging signal is read out from the imaging device 422 and perform the second focusing operation.

According to another embodiment of the disclosure, the OIS MCU 440 may perform the second focusing operation immediately after determining the target position for the first focusing operation. For example, when the determination of the target position for the first focusing operation is completed, the OIS MCU 440 may generate a focusing correction value based on the motion value in the z-axis direction. That is, the OIS MCU 440 may start the second focusing operation immediately after determining the target position for the first focusing operation. In this case, the OIS MCU 440 may generate a driving signal by adding the focusing correction value for the second focusing operation to the target position for the first focusing operation and control the camera module 110.

When the electronic apparatus 100*a* operates in the second mode, the OIS MCU 440 may not additionally perform the second focusing operation. Thus, when the OIS MCU 440 operates in the second mode, the OIS MCU 440 may generate a driving signal for the first focusing operation based on the lens target position generated by the camera control block 432 of the AP 430 and output the driving signal to the camera module 110 and may not perform correction of the motion in the z-axis direction based on the sensor detection value of the 6-axis sensor 220*a*. However, according to an embodiment of the disclosure, the OIS MCU 440 may perform processing for correction of the motion in the angular-speed direction in addition to correction of the motion in the z-axis direction.

According to an embodiment of the disclosure, the camera module 110 may include a plurality of camera modules 110, and the electronic apparatus 100*a* may operate in the first mode or the second mode when the wide-angle camera module 420 is activated. When the plurality of camera modules 110 include the wide-angle camera module 420 and the telephoto camera module, the AP 430 may select one of the wide-angle camera module 420 or the telephoto camera module of the camera module 110 based on the distance to the subject, the focal length, the photographing mode, the type of the subject, or the like.

For example, based on a zoom control signal input by the user, the AP 430 may activate the telephoto camera module in the case of zooming in to increase the focal length and may activate the wide-angle camera module 420 in the case of zooming out to decrease the photographing distance.

As another example, the AP 430 may activate the wide-angle camera module 420 in the case of a close-up mode for photographing a close subject and may activate the telephoto camera module in the case of a mode for photographing a distant subject such as a landscape. Also, separate photographing modes may be set, and the AP 430 may activate the wide-angle camera module 420 in the case of a portrait mode and may activate the telephoto camera module in the case of in a landscape mode.

However, in the mode in which the telephoto camera module is activated, because the focal length is set long and the depth of field is deep, even when there is a hand vibration in the z-axis direction, the subject may be likely to be maintained within the depth of field. Thus, according to an embodiment of the disclosure, the AP 430 may determine whether the first condition is satisfied, only when the wide-angle camera module 420 is selected and activated, and may control the electronic apparatus 100*a* to operate in the first mode for activating the second focusing operation, when the first condition is satisfied. In this case, when the telephoto camera module is selected and activated, the AP 430 may operate in the second mode without determining whether the first condition is satisfied.

When the camera module 110 includes three camera modules of an ultra-wide-angle camera module, a wide-angle camera module, and a telephoto camera module, the AP 430 may determine whether the first condition is satisfied, only when the ultra-wide-angle camera module is activated, and may operate in the first mode when the first condition is satisfied. When the wide-angle camera module or the telephoto camera module is activated, the AP 430 may operate in the second mode without determining whether the first condition is satisfied.

As another example, when the camera module 110 includes three camera modules of an ultra-wide-angle camera module, a wide-angle camera module, and a telephoto camera module, the AP 430 may determine whether the first condition is satisfied, only when the ultra-wide-angle camera module or the wide-angle camera module is activated, and may operate in the first mode when the first condition is satisfied. When the telephoto camera module is activated, the AP 430 may operate in the second mode without determining whether the first condition is satisfied.

Figure 5:
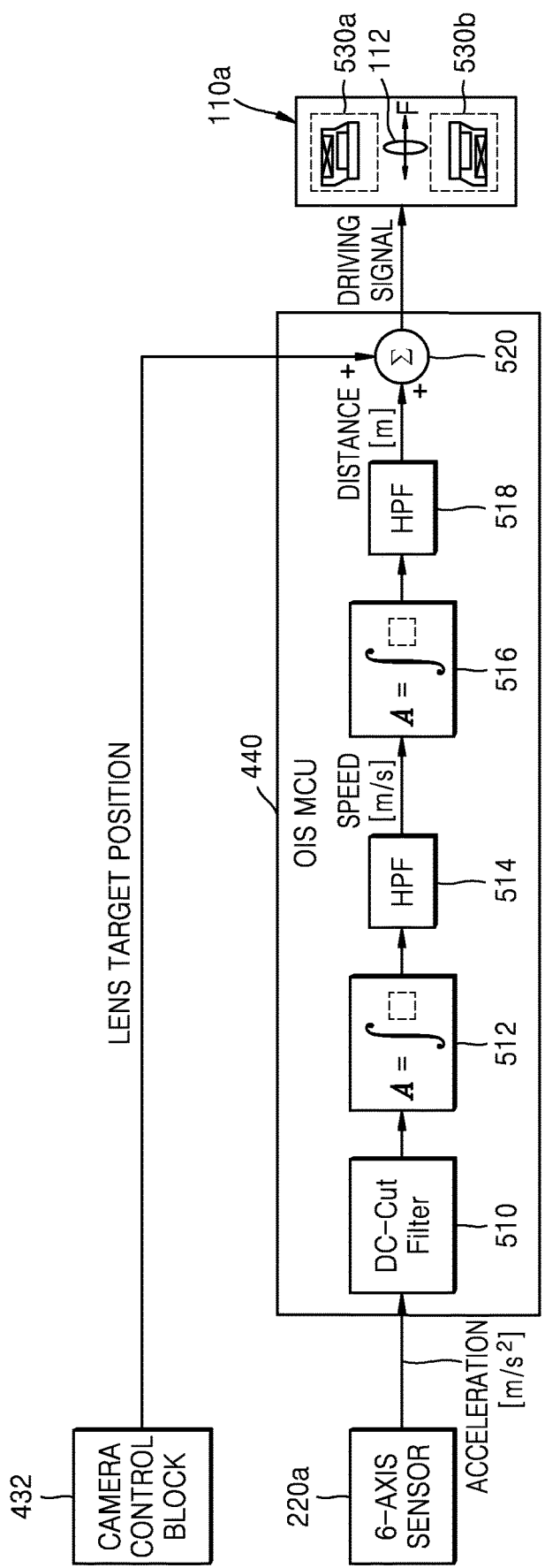
FIG. 5 is a diagram illustrating a camera control block, a 6-axis sensor, an optical image stabilization micro controller unit (OIS MCU), and a camera module according to an embodiment of the disclosure.

FIG. 5 is a diagram illustrating a camera control block, a 6-axis sensor, an OIS MCU, and a camera module according to an embodiment of the disclosure.

Referring to FIG. 5, an OIS MCU 440 according to an embodiment of the disclosure may include a direct current (DC)-cut filter (i.e., a low frequency filter) 510, a first integration block 512, a first high-pass filter (HPF) 514, a second integration block 516, a second HPF 518, and a summation block 520.

When the OIS MCU 440 operates in the first mode, an operation of processing calculation of the motion value in the z-axis direction and generation of the focusing correction value may be activated. When the electronic apparatus 100a operates in the first mode, the camera control block 432 may generate a control signal for facilitating the second focusing operation and output the control signal to the OIS MCU 440.

The DC-cut filter 510 of the OIS MCU 440 may receive the acceleration in the z-axis direction from the 6-axis sensor 220a. The DC-cut filter 510 may remove a DC component from the acceleration value in the z-axis direction to remove a gravitational acceleration component and an offset component.

Next, the DC-cut filter 510 may output the processed acceleration value to the first integration block 512. The first integration block 512 may integrate the acceleration value with respect to time. The output value of the first integration block 512 may be input to the first HPF 514.

The first HPF 514 may control a low-frequency component in the output value of the first integration block 512 to remove an integration drift caused by accumulation of errors in integration processing. In the acceleration measured by the 6-axis sensor 220a, an error may occur in the measurement value due to a factor such as noise. In the case of integration processing, errors in the measurement value may be accumulated during integration and thus the integration result value may be drifted. The first HPF 514 may remove an integral drift value due to such a drift phenomenon. When the output value of the first integration block 512 is processed by the first HPF 514, a speed value may be obtained.

Next, the first HPF 514 may output the speed value to the second integration block 516. The second integration block 516 may integrate the speed value with respect to time. The output value of the second integration block 516 may be input to the second HPF 518. The second HPF 518 may remove a low-frequency component from the output value of the second integration block 516 to remove the integral drift value. The output value of the second HPF 518 may correspond to a distance value. The OIS MCU 440 may generate a focusing correction value from the distance value. The OIS MCU 440 may generate a focusing correction value by multiplying the output value of the second integration block 516 by a gain value. The focusing correction value may be input to the summation block 520. The focusing correction value may be represented as Equation 1. In Equation 1, Gain denotes the gain value, and Acc denotes the z-axis acceleration value.

$$\text{Focusing Correction Value} = \text{Gain} * \iint Acc\, dt \quad \text{Equation 1}$$

The summation block 520 may receive and sum the lens target position information and the focusing correction value input from the camera control block 432 of the AP 430. The summation block 520 may output the sum of the lens target position information and the focusing correction value as a lens driving signal to the camera module 110a.

The summation block 520 may receive lens target position information for the first focusing operation and output a driving signal for the first focusing operation to the camera module 110a. Also, the summation block 520 may receive a focusing correction value for the second focusing operation and output a driving signal for the second focusing operation to the camera module 110a. The driving signal for the first focusing operation and the output of the driving signal for the second focusing operation may be output in different time periods. Thus, the OIS MCU 440 may control the camera module 110a to perform the second focusing operation after completing the first focusing operation.

According to an embodiment of the disclosure, when the electronic apparatus 100a operates in the second mode in which the second focusing operation is deactivated, the summation block 520 may receive and output only the driving signal for the first focusing operation. Also, when the electronic apparatus 100a operates in a manual focusing (MF) mode, the driving signal (i.e., the lens target position) for the first focusing operation may not be input to the summation block 520 and only the driving signal for the second focusing operation may be input to the summation block 520 and thus the driving signal for the second focusing operation may be input to the camera module 110a.

The camera module 110a may receive the driving signal input from the OIS MCU 440, and lens driving circuits 530a and 530b of the camera module 110a may drive the focus lens 112. The lens driving circuits 530a and 530b may drive the focus lens 112 in the optical-axis direction F according to the driving signal.

Figure 6:
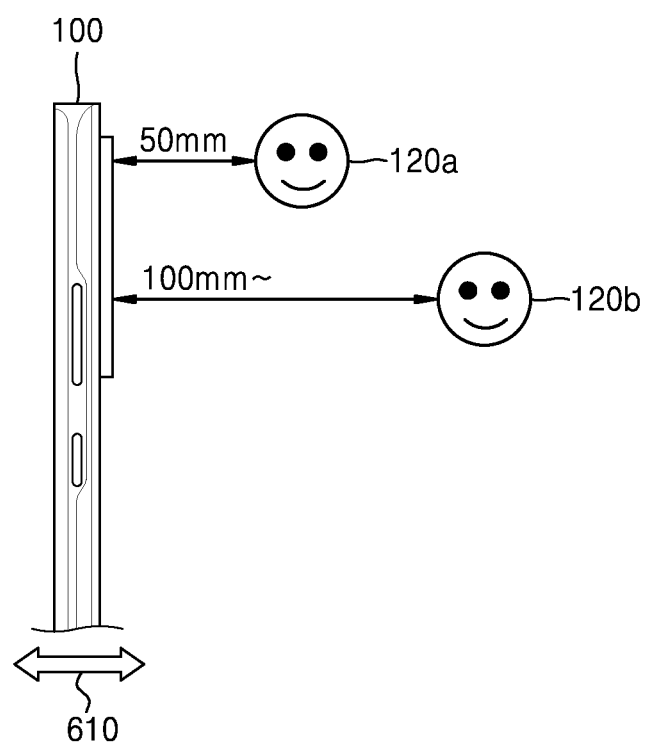
FIG. 6 is a diagram for describing a photographing distance according to an embodiment of the disclosure.

FIG. 6 is a diagram for describing a photographing distance according to an embodiment of the disclosure.

Referring to FIG. 6, an electronic apparatus 100 according to an embodiment of the disclosure may determine whether to perform the second focusing operation based on the photographing distances to subjects 120a and 120b. The photographing distances to the subjects 120a and 120b may be determined based on the center of the focus lens. The electronic apparatus 100 may have a shallower depth of field as the photographing distance decreases. When the depth of field decreases, the subject 120a may deviate from the range of the depth of field due to a vibration 610 in the optical-axis direction of the electronic apparatus 100. Thus, when the photographing distance decreases, the vibration 610 in the optical-axis direction of the electronic apparatus 100 may be likely to appear in the obtained image. Particularly, when the vibration 610 in the optical-axis direction occurs during the exposure period in which the first focusing operation is ended, because signals are accumulated in a state where the subject 120a deviates from the depth of field, the subject 120a may be out of focus in the obtained image.

On the other hand, when the photographing distance is greater than or equal to a certain distance, as the depth of field increases, because the subject 120b is within the range of the depth of field even when the vibration 610 in the optical-axis direction occurs, the influence of the vibration 610 in the optical-axis direction may not appear in the obtained image.

The electronic apparatus 100 according to embodiments of the disclosure may determine whether to additionally perform the second focusing operation, when the photographing distance is less than the distance reference value, and may not perform the second focusing operation when the photographing distance is greater than or equal to the distance reference value. As such, by determining whether to perform the second focusing operation based on the photographing distance, the second focusing operation may be performed only when additional vibration correction is required and unnecessary additional driving may be prevented.

According to an embodiment of the disclosure, the electronic apparatus 100 may determine whether to perform the second focusing operation, when the photographing distance is less than 100 mm, and may not perform the second focusing operation when the photographing distance is greater than or equal to 100 mm. When the photographing distance is greater than or equal to 100 mm, because the depth of field deviates from a shallow period, the electronic apparatus 100 may perform photographing without additionally correcting the vibration in the optical-axis direction after the first focusing operation.

Figure 7:
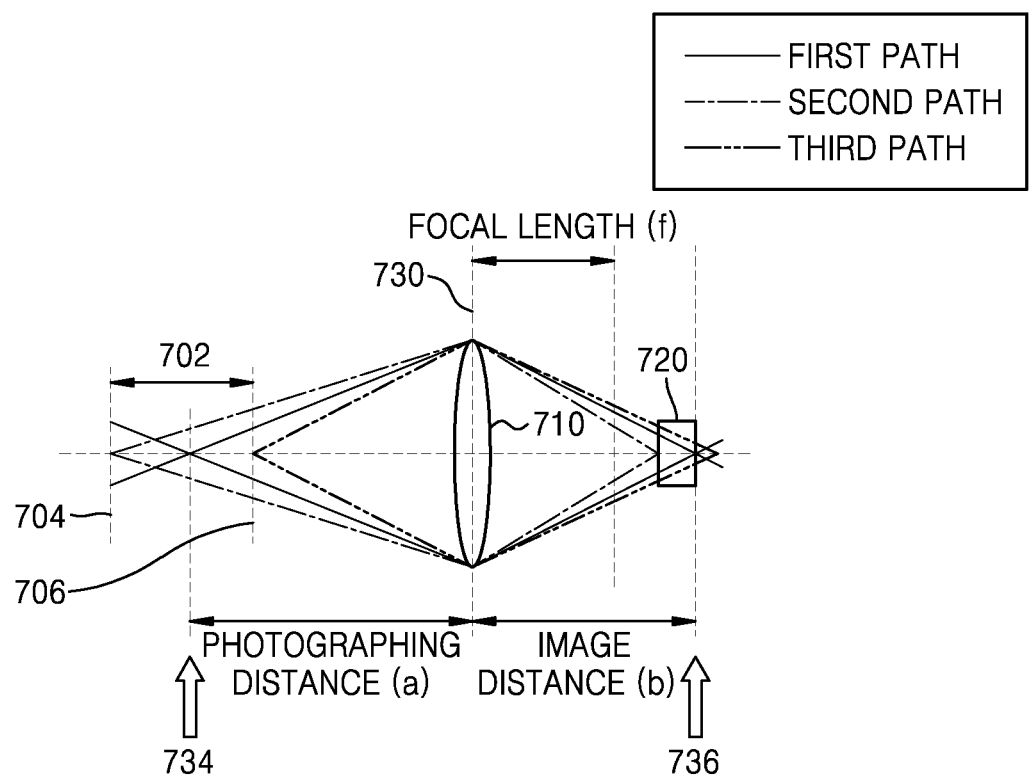
FIG. 7 is a diagram for describing a process of calculating a depth of field according to an embodiment of the disclosure.

FIG. 7 is a diagram for describing a process of calculating a depth of field according to an embodiment of the disclosure.

Referring to FIG. 7, a focus lens 710, an imaging device 720, light of a first path, light of a second path, and light of a third path are illustrated.

When the photographing distance is less than the distance reference value, the electronic apparatus 100 may determine whether the depth of field is less than or equal to the depth reference value. Because the vibration in the optical-axis direction becomes a problem when the depth of field is shallow, even when the photographing distance is short, the electronic apparatus 100 may not perform the second focusing operation for correcting the vibration in the optical-axis direction when the depth of field is not shallow.

The depth of field may be an area that may be considered as being in focus in photographing. When the depth of field is deep, it may mean that the length of the area that may be considered as being in focus is long, and when the depth of field is shallow, it may mean that the length of the area that may be considered as being in focus is short. The depth of field may vary depending on the aperture value, the focal length of the lens, or the distance to the subject. The depth of field may increase as the aperture value decreases and may increase as the distance to the subject increases.

Embodiments of the disclosure may measure a depth-of-field value by using a photographing distance variable that is a distance to the subject.

A photographing distance "a" may represent the distance from a central axis 730 of the focus lens 710 to a subject position 734. A depth of field 702 may be determined by the photographing distance "a," an image distance "b," a pixel size Psize, an F number F#, and a focal length "f." As described above, the photographing distance "a" may be measured by the second sensor or may be determined based on the result value of the first focusing operation.

The image distance "b" may represent the distance from the central axis 730 of the focus lens 710 to an imaging position 736. FIG. 7 illustrates the subject position 734 and the imaging position 736 based on the first path of light. The focal length "f" may be the distance between a point where incident light entering the focus lens 710 is refracted and converged to one point and the central axis 730 of the focus lens 710. The focal length "f" may be determined according to the type of the focus lens 710.

A relationship of Equation 2 may be established between the photographing distance "a," the image distance "b," and the focal length "f" according to the lens formula.

$$\frac{1}{a} + \frac{1}{b} = \frac{1}{f} \qquad \text{Equation 2}$$

The photographing distance "a" may be measured as described above, and the image distance "b" may be determined from the photographing distance "a" and the focal length "f" as in Equation 3 because the focal length "f" is determined by the type of the lens.

$$b = \frac{f^2}{a-f} \qquad \text{Equation 3}$$

The F number F# may be determined by the focal length "f" and a lens diameter D as in Equation 4.

$$F\# = \frac{f}{D} \qquad \text{Equation 4}$$

The depth of field may be defined as the difference between a rear depth 704 and a front depth 706 as in Equation 5.

Depth of Field=Rear Depth−Front Depth     Equation 5

The front depth 706 may be defined as in Equation 6, and the rear depth 704 may be defined as in Equation 7. The pixel size Psize may be a pixel size value of the image sensor and may be obtained from spec information of the image sensor.

$$\text{Front Depth} = \frac{f^2}{((Psize + F\#)*2 + b)} + f \qquad \text{Equation 6}$$

$$\text{Rear Depth} = \frac{f^2}{(-((Psize + F\#)*2) + b)} + f \qquad \text{Equation 7}$$

When the front depth value and the rear depth value are substituted into a depth-of-field formula of Equation 5, the depth-of-field value may be defined as in Equation 8.

$$\begin{aligned}\text{Depth of Field} &= \left\{\frac{f^2}{(-((Psize + F\#)*2) + b)} + f\right\} - \left\{\frac{f^2}{((Psize + F\#)*2 + b)} + f\right\} \\ &= \frac{f^2}{(-((Psize + F\#)*2) + b)} - \frac{f^2}{((Psize + F\#)*2 + b)} \\ &= \frac{2f^2}{(-((Psize + F\#)*2) + b)}\end{aligned} \qquad \text{Equation 8}$$

Thus, the depth of field 702 may decrease as the image distance "b" increases, and the image distance "b" may increase as the photographing distance "a" decreases. As a result, the depth of field 702 may decrease as the photographing distance "a" decreases.

The electronic apparatus 100 may calculate the depth of field from the pixel size Psize, the F number F#, the image distance "b," and the focal length "f" and determine whether the depth of field is less than or equal to the depth reference value. According to an embodiment of the disclosure, the depth reference value may be set to 8 mm Thus, when the photographing distance is less than a distance reference value of 100 mm and the depth of field is less than or equal to a depth reference value of 8 mm, the electronic apparatus 100 may determine that the first condition is satisfied and activate the second focusing operation.

According to an embodiment of the disclosure, the focal length, the pixel size, and the F number may be prestored for each camera module as in Table 1.

TABLE 1

|  | Wide-angle camera module | Ultra-wide-angle camera Module |
|---|---|---|
| Focal length (mm) | 6.65 | 2.22 |
| Pixel size (mm) | 0.00080 | 0.00140 |
| F number (mm) | 1.890 | 2.280 |

Figure 8:
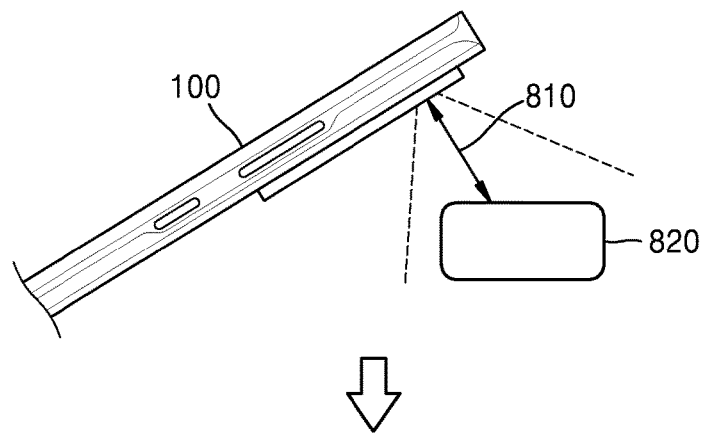
FIG. 8 is a diagram illustrating an amount of hand vibration of an electronic apparatus and a depth of a camera module according to an embodiment of the disclosure.

FIG. 8 is a diagram illustrating an amount of hand vibration of an electronic apparatus and a depth of a camera module according to an embodiment of the disclosure.

Referring to FIG. 8, it may be seen that when a subject 820 at a close distance is photographed by the camera module of an electronic apparatus 100, a depth of field is determined by a photographing distance and is not a variable depending on a viewing angle. In the case of an ultra-wide-angle camera module, the viewing angle is 120 degrees or more, and the depth of field may be likely to be determined to be shallow because the closest photographing distance of this camera module is 50 mm or less. Thus, the electronic apparatus 100 according to embodiments of the disclosure may not determine whether to perform the second focusing operation simply with reference to the wide angle but may determine whether to perform the second focusing operation based on the photographing distance and the depth of field.

As an example of the camera module for photographing the subject 820 at a close distance, the wide-angle camera module may have a closest photographing distance of 100 mm and the depth of field may be 1.2 mm when photographing is performed at the closest photographing distance. As another example of the camera module, the ultra-wide-angle camera module may have a closest photographing distance of 50 mm and the depth of field may be 5.9 mm when photographing is performed at the closest photographing distance.

The viewing angle of the wide-angle camera module may be 120 degrees and the viewing angle of the ultra-wide camera module may be 83 degrees, wherein it may have a wide viewing angle according to the lens characteristics including the focal length but the depth of field may not be directly determined by the viewing angle.

Thus, the electronic apparatus 100 according to an embodiment of the disclosure may determine whether the first condition is satisfied, when a particular camera module having a short focal length and a shallow depth of field is selected among a plurality of camera modules by considering the characteristics of each camera module, and may perform the second focusing operation when the first condition is satisfied.

Also, as a result of detecting the amount of hand vibration in a z-axis direction 810 in the photographing operation of the electronic apparatus 100, a hand vibration of about 8 mm is measured when the subject 820 having a photographing distance of about 50 mm is photographed. According to the experimental result, in an embodiment of the disclosure, the depth reference value of the first condition for determining whether to perform the second focusing operation is determined as 8 mm. The distance reference value and the depth reference value may be changed according to embodiments of the disclosure. According to an embodiment of the disclosure, the user may change, by a user input, the distance reference value and the depth reference value used to determine whether to perform the second focusing operation. The electronic apparatus 100 may change the distance reference value or the depth reference value based on the user input.

Figure 9:
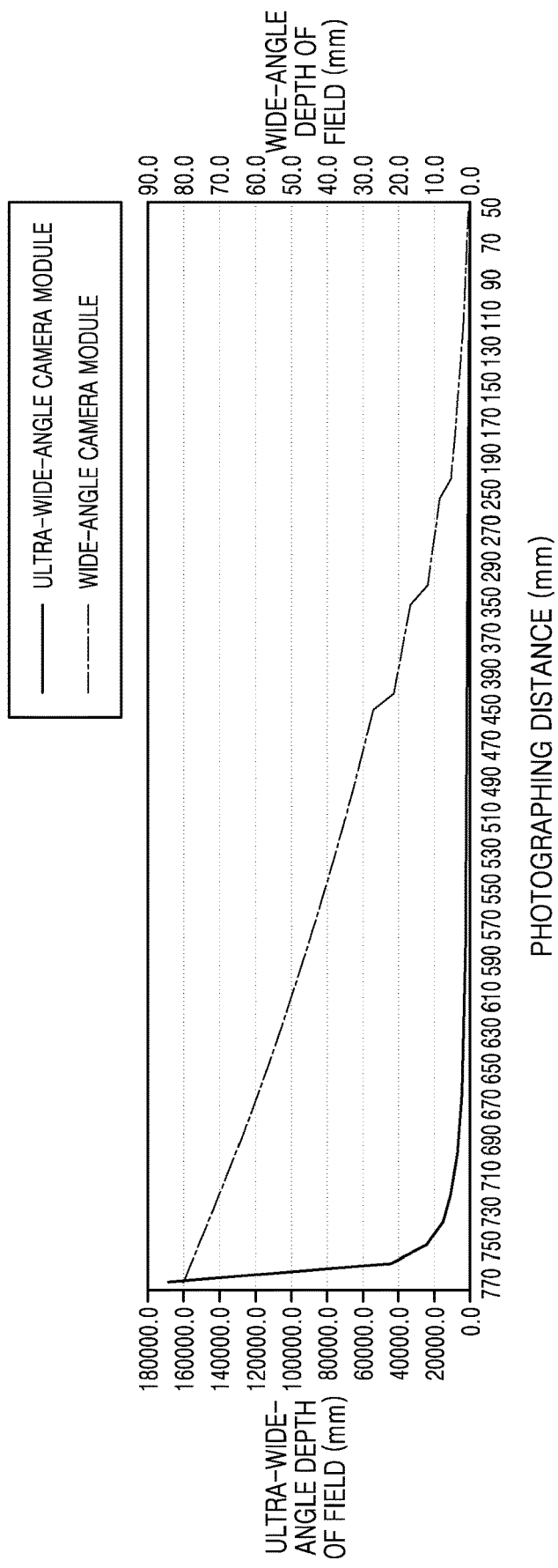
FIG. 9 is a graph illustrating the relationship between a photographing distance and a depth of field according to an embodiment of the disclosure.

FIG. 9 is a graph illustrating the relationship between a photographing distance and a depth of field according to an embodiment of the disclosure.

According to an embodiment of the disclosure, it may be seen that the depth of field decreases as the photographing distance decreases, and the depth of field increases as the photographing distance increases. This change pattern may appear differently depending on the type of camera module.

Referring to FIG. 9, illustrated is a relationship between a photographing distance and a depth of field for an ultra-wide-angle camera module and a wide-angle camera module illustrated in FIG. 8. First, both types of camera modules may have a deep depth of field in long-distance photographing with a long photographing distance. Particularly, in the case of the ultra-wide-angle camera module, it may be seen that the depth of field increases rapidly as the photographing distance increases. When the depth of field increases, even when a vibration in the optical-axis direction occurs in the electronic apparatus 100, because the subject is within the depth of field, correction of the vibration in the optical-axis direction may not be required. It may be seen from the graph of FIG. 9 that the second focusing operation for correcting the vibration in the optical-axis direction is not required in the case of long-distance photographing.

Figure 10:
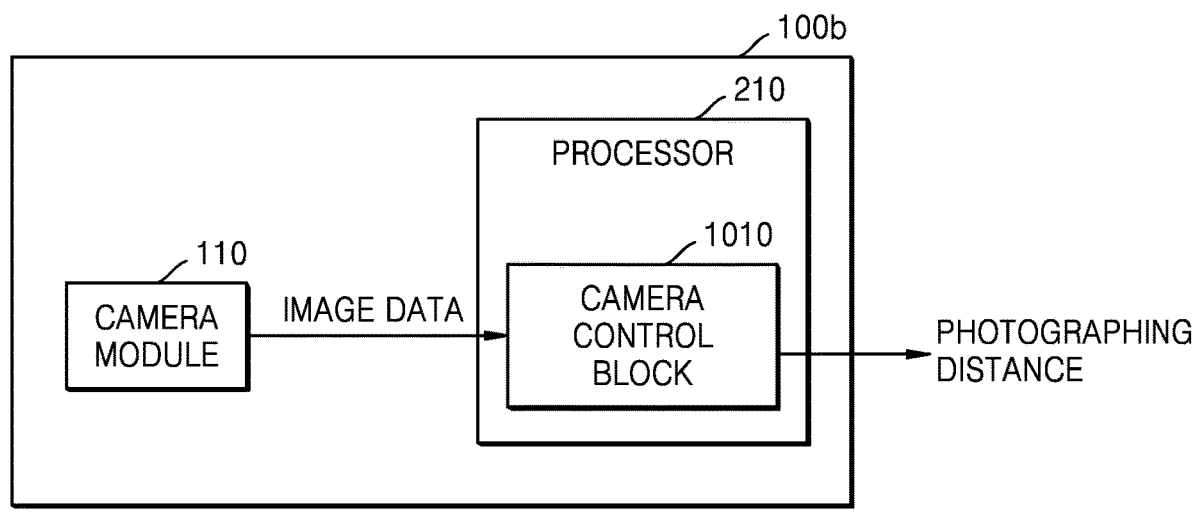
FIG. 10 is a diagram illustrating a process of obtaining photographing distance information according to an embodiment of the disclosure.

FIG. 10 is a diagram illustrating a process of obtaining photographing distance information according to an embodiment of the disclosure.

Referring to FIG. 10, according to an embodiment of the disclosure, an electronic apparatus 100*b* may calculate a photographing distance based on image data. The camera module 110 of the electronic apparatus 100*b* may generate image data by photographing the subject and output the image data to the processor 210.

A camera control block 1010 of the processor 210 may perform processing for controlling the camera by using the image data. The camera control block 1010 may correspond to the camera control block 432 of the AP 430 described above with reference to FIG. 4. The camera control block 1010 may perform focusing processing by using the image data. The focusing processing may be performed in various ways. The focusing processing may use, for example, a phase difference AF method or a contrast AF method using the image data. In the contrast AF method, the contrast may be measured at the edge of the image data while the focus lens is continuously moved, and it is determined that focusing is achieved when the contrast is maximized. Based on the lens target position of the focus lens determined by the contrast AF method, the camera control block 1010 may measure a distance to the subject.

The camera control block 1010 may obtain the image distance "b" from the lens target position determined by contrast AF and may determine the photographing distance "a" by using the lens formula of Equation 1 by using the focal length "f" and the image distance "b" of the lens. As such, according to an embodiment of the disclosure, the processor 210 may perform focusing processing based on the image data, calculate the photographing distance "a" according to the result value of the focusing processing, and obtain the photographing distance information.

Figure 11:
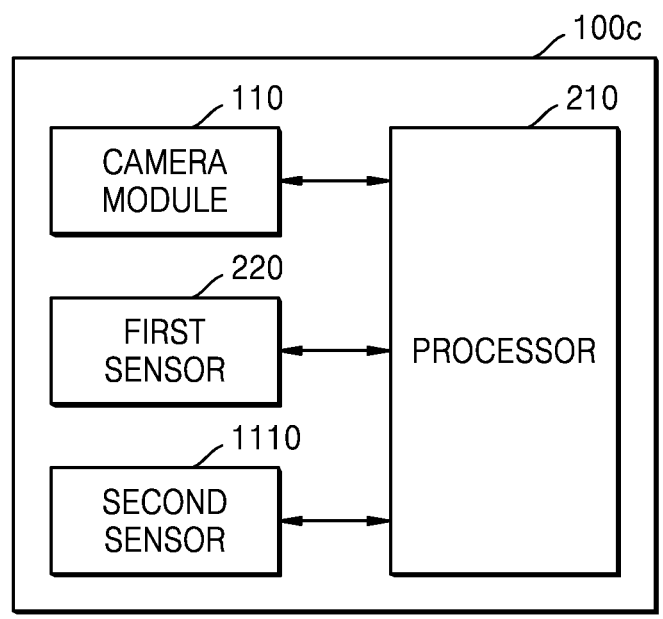
FIG. 11 is a block diagram illustrating a structure of an electronic apparatus according to an embodiment of the disclosure.

FIG. 11 is a block diagram illustrating a structure of an electronic apparatus according to an embodiment of the disclosure.

Referring to FIG. 11, according to another embodiment of the disclosure, an electronic apparatus 100c may include a camera module 110, a processor 210, a first sensor 220, and a second sensor 1110. According to an embodiment of the disclosure, the electronic apparatus 100c may include the second sensor 1110 capable of measuring the distance to a front object. The electronic apparatus 100c may measure a photographing distance that is a distance to the subject by using a detection value of the second sensor 1110.

The second sensor 1110 may be a sensor for measuring a distance to a front object. The second sensor 1110 may be implemented as various types of sensors of a time of flight (ToF) method and may be implemented, for example, as an ultrasonic sensor, an infrared sensor, a laser imaging, detection, and ranging (LIDAR) sensor, a radio detection and ranging (RADAR) sensor, or a camera sensor. According to an embodiment of the disclosure, the second sensor 1110 may be implemented by being embedded in some pixels in the image sensor of the camera module 110. The image sensor may include a phase difference detection pixel for detecting a phase difference, and the processor 210 may measure a distance to the subject by using the output value of the phase difference detection pixel.

The processor 210 may calculate a photographing distance by using the sensor detection value of the second sensor 1110. Also, the processor 210 may perform focusing processing by using the sensor detection value of the second sensor 1110.

Figure 12:
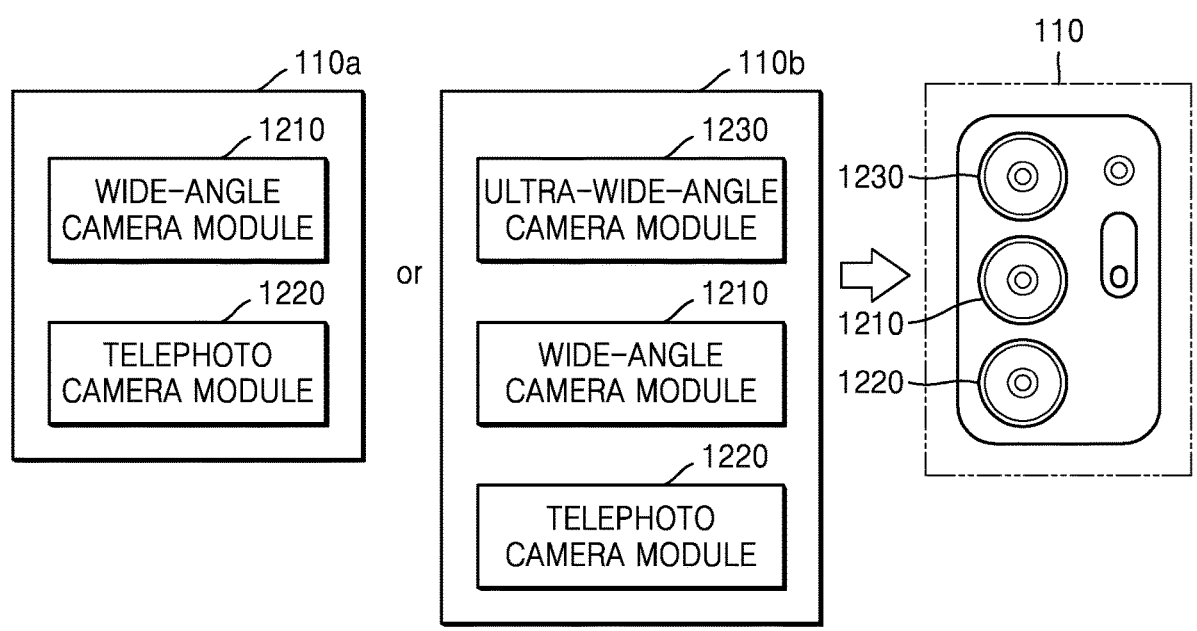
FIG. 12 is a diagram illustrating a structure of a camera module according to an embodiment of the disclosure.

FIG. 12 is a diagram illustrating a structure of a camera module according to an embodiment of the disclosure.

Referring to FIG. 12, camera modules 110a and 110b according to an embodiment of the disclosure include a plurality of camera modules. For example, the camera module 110a may include a wide-angle camera module 1210 and a telephoto camera module 1220. As another example, the camera module 110b may include an ultra-wide-angle camera module 1230, a wide-angle camera module 1210, and a telephoto camera module 1220.

The processor 210 may perform photographing by selecting one of a plurality of camera modules 1210, 1220, and 1230 based on a photographing distance, a photographing mode, a zoom control signal, or the like. For example, the processor 210 may select the telephoto camera module 1220 when the zoom level is increased by a zoom-in control signal and may sequentially select the wide-angle camera module 1210 and the ultra-wide-angle camera module 1230 when the zoom level is decreased by a zoom-out control signal. As another example, the processor 210 may select the telephoto camera module 1220 in the landscape mode and select the ultra-wide-angle camera module 1230 or the wide-angle camera module 1210 in the portrait mode or the close-up mode. As another example, the processor 210 may select the ultra-wide-angle camera module 1230 when the photographing distance is less than or equal to a first reference value, may select the wide-angle camera module 1210 when the photographing distance is between the first reference value and a second reference value, and may select the telephoto camera module 1220 when the photographing distance is greater than or equal to the second reference value.

The processor 210 may determine whether the photographing distance and the depth of field satisfy the first condition, only when the wide-angle camera module 1210 or the ultra-wide-angle camera module 1230 is selected among the plurality of camera modules. As described above, z-axis vibration correction may be required when the photographing distance is short and the depth of field is shallow and may be less required when the photographing distance is long and the depth of field is deep.

Thus, according to an embodiment of the disclosure, when the telephoto camera module 1220 is selected, the processor 210 may determine that z-axis vibration correction is not required and may not determine whether the first condition is satisfied. By this additional condition, the processor 210 may prevent unnecessary determination of whether the first condition requiring a plurality of operations is satisfied, thus reducing the processing load thereof.

Figure 13:
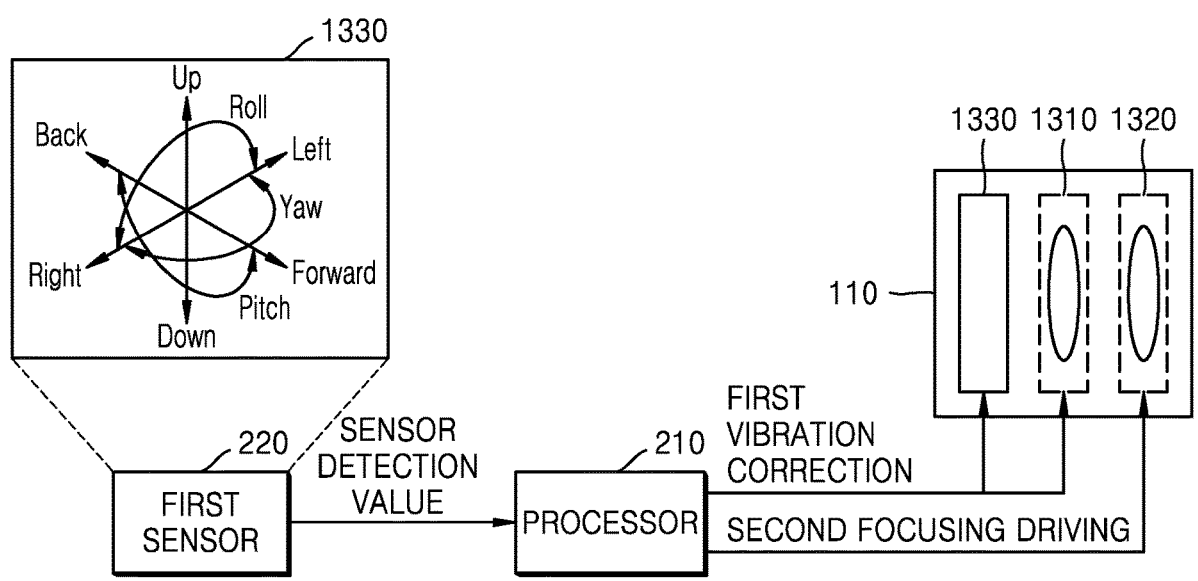
FIG. 13 is a diagram illustrating a configuration for performing vibration correction according to an embodiment of the disclosure.

FIG. 13 is a diagram illustrating a configuration for performing vibration correction according to an embodiment of the disclosure.

Referring to FIG. 13, a degree of freedom of an object in three-dimensional space may include a total of six axes and may include pitch, yaw, and roll as rotational motions and x-axis, y-axis, and z-axis shifts as linear motions in vertical, horizontal, and front/rear directions. The electronic apparatus 100 may move in the three-dimensional space, and the vibration may include 6-axis motion components. According to an embodiment of the disclosure, the first sensor 220 of the electronic apparatus 100 may detect a motion in the 6-axis direction.

The processor 210 may receive a sensor detection value representing a motion component in the 6-axis direction from the first sensor 220. The sensor detection value may include an angular speed of a pitch component, an angular speed of a yaw component, an angular speed of a roll component, an x-axis acceleration, a y-axis acceleration, and a z-axis acceleration. The processor 210 may perform vibration correction by using the sensor detection value of the first sensor 220.

According to an embodiment of the disclosure, the processor 210 may always correct the vibration in the angular-speed directions of the pitch, yaw, and roll components and the vibration in the x-axis and y-axis directions regardless of whether the first condition is satisfied and may correct the vibration in the z-axis direction only when the first condition is satisfied. Here, vibration correction for correcting the vibration in the angular-speed directions of the pitch, yaw, and roll components and the vibration in the x-axis and y-axis directions regardless of whether the first condition is satisfied will be referred to as first vibration correction, and vibration correction in the z-axis direction performed when the first condition is satisfied will be referred to as the second focusing operation.

The first vibration correction may use an optical correction method or an electronic correction method. The optical vibration correction may use an image sensor shift method or a lens shift method.

In the image sensor shift method, the vibration may be corrected by moving an image sensor 1330 in a direction opposite to a direction in which the electronic apparatus 100 moves. When the electronic apparatus 100 moves to the left, the image sensor 1330 may move to the right, and when the electronic apparatus 100 moves downward, the image sensor 1330 may move upward. The image sensor shift method may be applied regardless of the type of the lens. In the lens shift method, the vibration may be corrected by moving some lenses of the camera module 110. In the lens shift method, a vibration correction lens 1310 may be included in the camera module 110, and the vibration may be corrected by moving the vibration correction lens 1310 to compensate for the motion of the electronic apparatus 100. The electronic apparatus 100 may correct the vibration of the electronic apparatus 100 by moving the vibration correction lens 1310 in a direction opposite to a direction in which the vibration occurs.

The electronic vibration correction may be a method of correcting the vibration by using image processing on the image data. An electronic vibration correction function according to an embodiment of the disclosure may be to secure a shutter speed with high-sensitivity setting. In the electronic vibration correction according to another embodiment of the disclosure, the vibration may be corrected by setting the exposure to be low, increasing the shutter speed, and then improving the brightness of an obtained picture.

Separately from the first vibration correction, the second focusing driving may be performed by using the driving of the focus lens 1320 in the z-axis direction when the first condition is satisfied. Thus, conditions under which the first vibration correction and the second focusing driving are performed may be different from each other, and optical devices used by using the vibration correction may be different from each other.

Figure 14:
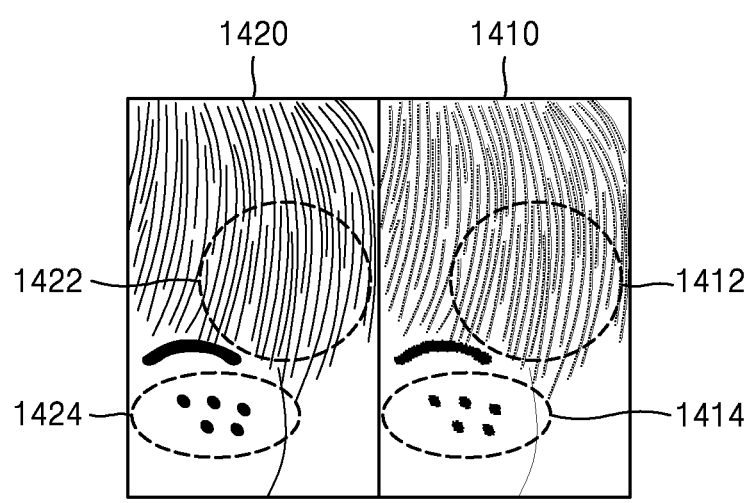
FIG. 14 is a diagram for comparing an obtained image with an obtained image according to a comparative example according to an embodiment of the disclosure.

FIG. 14 is a diagram for comparing an obtained image with an obtained image according to a comparative example according to an embodiment of the disclosure.

A comparative example image 1410 and an embodiment image 1420 according to an embodiment of the disclosure are both obtained at a photographing distance of less than 100 mm and a depth of field of 8 mm or less. The second focusing operation is not applied in the comparative example image 1410, and the second focusing operation is applied in the embodiment image 1420.

Referring to FIG. 14, in a comparative example image 1410, it may be seen that blurring appears in an obtained image because a doll's hair portion 1412 and a face freckle portion 1414 are out of focus due to the vibration. On the other hand, in the embodiment image 1420, it may be seen that an image is clearly obtained because a doll's hair portion 1422 and a face freckle portion 1424 are photographed in a focused state.

Figure 15:
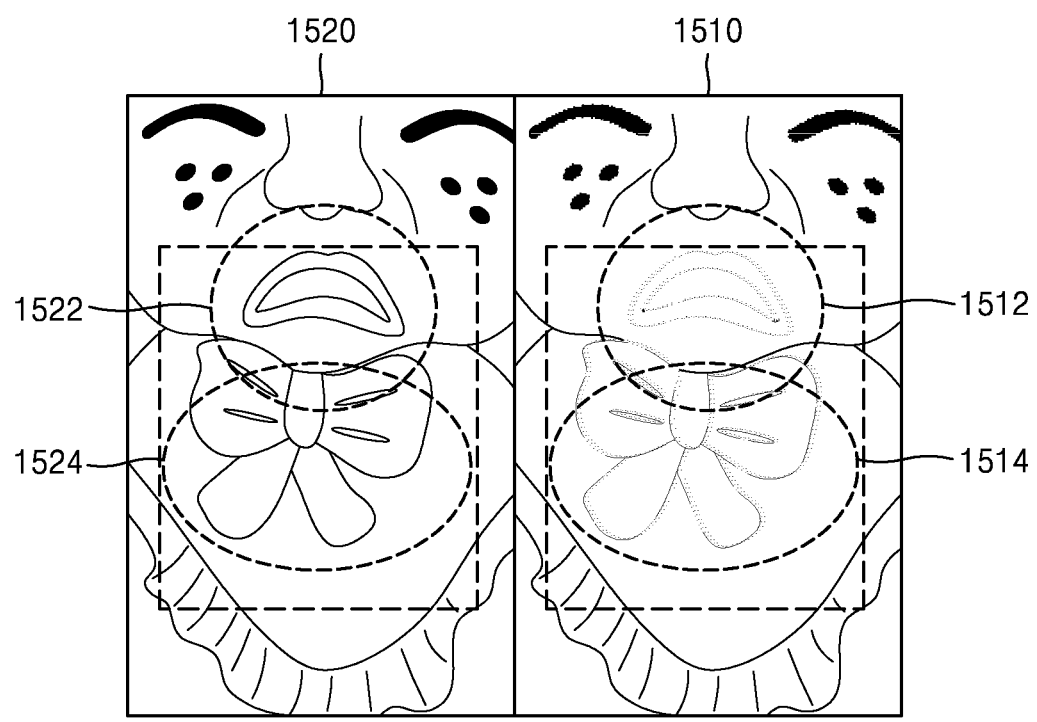
FIG. 15 is a diagram for comparing an obtained image with an obtained image according to a comparative example according to an embodiment of the disclosure.

FIG. 15 is a diagram for comparing an obtained image with an obtained image according to a comparative example according to an embodiment of the disclosure.

A comparative example image 1510 and an embodiment image 1520 according to an embodiment of the disclosure are both obtained at a photographing distance of less than 100 mm and a depth of field of 8 mm or less. The second focusing operation is not applied in the comparative example image 1510, and the second focusing operation is applied in the embodiment image 1520.

Referring to FIG. 15, in a comparative example image 1510, it may be seen that blurring appears in the obtained image because a doll's lip portion 1512 and a doll's ribbon portion 1514 are out of focus due to the vibration. On the other hand, in the embodiment image 1520, it may be seen that an image is clearly obtained because a doll's lip portion 1522 and a doll's ribbon portion 1524 are photographed in a focused state.

Figure 16:
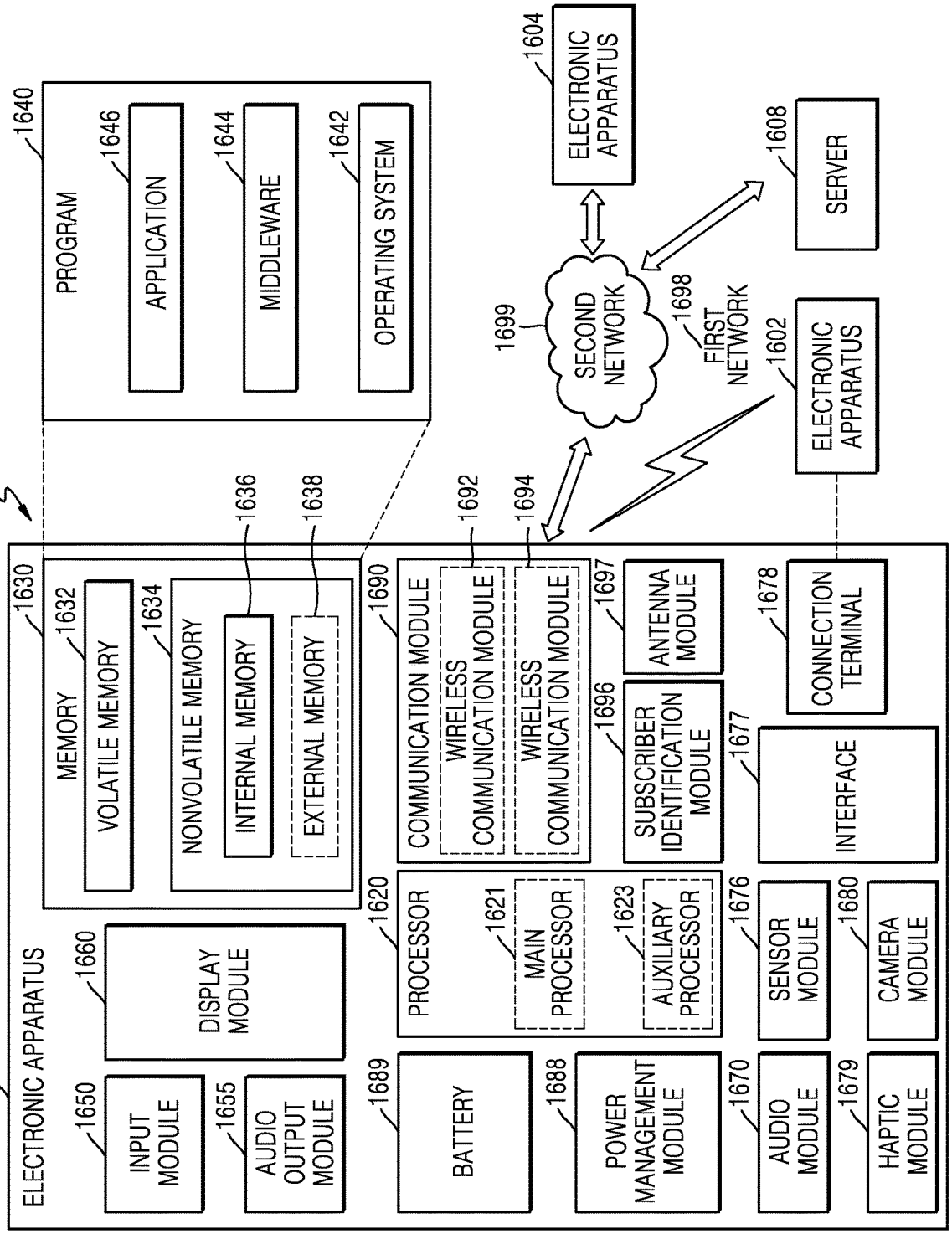
FIG. 16 is a block diagram of an electronic apparatus in a network environment according to an embodiment of the disclosure.

FIG. 16 is a block diagram of an electronic apparatus in a network environment according to an embodiment of the disclosure.

Referring to FIG. 16, in a network environment 1600, an electronic apparatus 1601 may communicate with an electronic apparatus 1602 through a first network 1698(e.g., a short-range wireless communication network) or may communicate with at least one of an electronic apparatus 1604 or a server 1608 through a second network 1699 (e.g., a long-range wireless communication network).

According to an embodiment of the disclosure, the electronic apparatus 1601 may communicate with the electronic apparatus 1604 through the server 1608. According to an embodiment of the disclosure, the electronic apparatus 1601 may include a processor 1620, a memory 1630, an input module 1650, an audio output module 1655, a display module 1660, an audio module 1670, a sensor module 1676, an interface 1677, a connection terminal 1678, a haptic module 1679, a camera module 1680, a power management module 1688, a battery 1689, a communication module 1690, a subscriber identification module 1696, or an antenna module 1697.

In some embodiments of the disclosure, the electronic apparatus 1601 may not include at least one of these elements (e.g., the connection terminal 1678) or may further include one or more other elements. In some embodiments of the disclosure, some of these elements (e.g., the sensor module 1676, the camera module 1680, or the antenna module 1697) may be integrated into one element (e.g., the display module 1660).

For example, the processor 1620 may control at least one other element (e.g., a hardware or software element) of the electronic apparatus 1601 connected to the processor 1620 by executing software (e.g., the program 1640) and may perform various data processing and operations. According to an embodiment of the disclosure, as at least a portion of data processing or operation, the processor 1620 may store commands or data received from another element (e.g., the sensor module 1676 or the communication module 1690) in a volatile memory 1632, may process the commands or data stored in the volatile memory 1632, and may store the result data in a nonvolatile memory 1634.

According to an embodiment of the disclosure, the processor 1620 may include a main processor 1621 (e.g., a central processing unit or an application processor) or an auxiliary processor 1623 (e.g., a graphics processing unit, a neural processing unit (NPU), an image signal processor, a sensor hub processor, or a communication processor) that may be operated together with or independently of the main processor 421. For example, when the electronic apparatus 1601 includes the main processor 1621 and the auxiliary processor 1623, the auxiliary processor 1623 may use less power than the main processor 1621 or may be set to be specialized for a designated function. The auxiliary processor 1623 may be implemented separately from or as a portion of the main processor 1621.

For example, the auxiliary processor 1623 may control at least some of the states or the function related to at least one element (e.g., the display module 1660, the sensor module 1676, or the communication module 1690) among the elements of the electronic apparatus 1601 on behalf of the main processor 1621 while the main processor 1621 is in an inactive (e.g., sleep) state or together with the main processor 1621 while the main processor 1621 is in an active (e.g., application execution) state.

According to an embodiment of the disclosure, the auxiliary processor 1623 (e.g., an image signal processor or a communication processor) may be implemented as a portion of another element (e.g., the camera module 1680 or the communication module 1690) functionally related thereto.

According to an embodiment of the disclosure, the auxiliary processor 1623 (e.g., a neural processing unit) may include a hardware structure specialized for the processing of an artificial intelligence model. The artificial intelligence model may be generated through machine learning. This training may be performed, for example, in the electronic apparatus 1601 itself in which the artificial intelligence model is trained or may be performed through a separate server (e.g., the server 1608). The training algorithm may include, for example, supervised learning, unsupervised learning, semi-supervised learning, or reinforcement learning but is not limited thereto.

The artificial intelligence model may include a plurality of neural network layers. The artificial neural network may include, but is not limited to, Deep Neural Networks (DNN), Convolutional Neural Network (CNN), Recurrent Neural Network (RNN), Restricted Boltzmann Machine (RBM), Deep Belief Network (DBN), Bidirectional Recurrent Deep Neural Network (BRDNN), Deep Q-network, or a combination of two or more of the above networks. The artificial intelligence model may additionally or alternatively include a software structure in addition to the hardware structure.

The memory 1630 may store various data used by at least one element (e.g., the processor 1620 or the sensor module 1676) of the electronic apparatus 1601. The data may include, for example, software (e.g., the program 1640) and input data or output data about commands related thereto. The memory 1630 may include a volatile memory 1632 or a nonvolatile memory 1634.

The program 1640 may be stored as software in the memory 1630 and may include, for example, an operating system 1642, middleware 1644, or an application 1646.

The input module 1650 may receive a command or data to be used by an element (e.g., the processor 1620) of the electronic apparatus 1601, from the outside (e.g., the user) of the electronic apparatus 1601. The input module 1650 may include, for example, a microphone, a mouse, a keyboard, a key (e.g., a button), or a digital pen (e.g., a stylus pen).

The audio output module 1655 may output an audio signal to the outside of the electronic apparatus 1601. The audio output module 1655 may include, for example, a speaker or a receiver. The speaker may be used for general purposes such as multimedia playback or recording playback. The receiver may be used to receive incoming calls. According to an embodiment of the disclosure, the receiver may be implemented separately from or as a portion of the speaker.

The display module 1660 may visually provide information to the outside (e.g., the user) of the electronic apparatus 1601. The display module 1660 may include, for example, a display, a hologram device, or a projector, and a control circuit for controlling the corresponding device. According to an embodiment of the disclosure, the display module 1660 may include a touch sensor set to detect a touch or a pressure sensor set to measure the strength of a force generated by the touch.

The audio module 1670 may convert a sound into an electric signal or convert an electric signal into a sound. According to an embodiment of the disclosure, the audio module 1670 may obtain a sound through the input module 1650 or may output a sound through the audio output module 1655 or an external electronic apparatus (e.g., the electronic apparatus 1602) (e.g., a speaker or a headphone) directly or wirelessly connected to the electronic apparatus 1601.

The sensor module 1676 may detect an operating state (e.g., power or temperature) of the electronic apparatus 1601 or an external environmental state (e.g., user state) and generate an electrical signal or data value corresponding to the detected state. According to an embodiment of the disclosure, the sensor module 1676 may include, for example, a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor.

The interface 1677 may support one or more designated protocols that may be used by the electronic apparatus 1601 to be directly or wirelessly connected to an external electronic apparatus (e.g., the electronic apparatus 1602). According to an embodiment of the disclosure, the interface 1677 may include, for example, a high definition multimedia interface (HDMI), a universal serial bus (USB) interface, a secure digital (SD) card interface, or an audio interface.

The connection terminal 1678 may include a connector through which the electronic apparatus 1601 may be physically connected to an external electronic apparatus (e.g., the electronic apparatus 1602). According to an embodiment of the disclosure, the connection terminal 1678 may include, for example, an HDMI connector, a USB connector, an SD card connector, or an audio connector (e.g., a headphone connector).

The haptic module 1679 may convert an electrical signal into a mechanical stimulus (e.g., vibration or movement) or an electrical stimulus that the user may recognize through a haptic or kinesthetic sense. According to an embodiment of the disclosure, the haptic module 1679 may include, for example, a motor, a piezoelectric device, or an electrical stimulation device.

The camera module 1680 may capture still images and moving images. According to an embodiment of the disclosure, the camera module 1680 may include one or more lenses, image sensors, image signal processors, or flashes.

The power management module 1688 may manage power supplied to the electronic apparatus 1601. According to an embodiment of the disclosure, the power management module 1688 may be implemented as, for example, at least a portion of a power management integrated circuit (PMIC).

The battery 1689 may supply power to at least one element of the electronic apparatus 1601. According to an embodiment of the disclosure, the battery 1689 may include, for example, a non-rechargeable primary cell, a rechargeable secondary cell, or a fuel cell.

The communication module 1690 may support establishment of a direct (e.g., wired) communication channel or a wireless communication channel between the electronic apparatus 1601 and an external electronic apparatus (e.g., the electronic apparatus 1602, the electronic apparatus 1604, or the server 1608) and performance of communication through an established communication channel. The communication module 1690 may include one or more communication processors that operate independently of the processor 1620 (e.g., an application processor) and support direct (e.g., wired) communication or wireless communication.

According to an embodiment of the disclosure, the communication module 1690 may include a wireless communication module 1692 (e.g., a cellular communication module, a short-range communication module, or a global navigation satellite system (GNSS) communication module) or a wired communication module 1694 (e.g., a local area network (LAN) communication module or a power line communication module). The corresponding communication module among these communication modules may communicate with the external electronic apparatus 1604 through the first network 1698 (e.g., a short-range communication network such as Bluetooth, Wi-Fi direct, or infrared data association (IrDA)) or the second network 1699 (e.g., a long-range communication network such as a legacy cellular network, a fifth generation (5G) network, a next-generation communication network, the Internet, or a computer network (e.g., LAN or wide area network WAN)). These various types of communication modules may be integrated into one element (e.g., a single chip) or may be implemented as a plurality of components (e.g., multiple chips) that separate from each other. The wireless communication module 1692 may identify or authenticate the electronic apparatus 1601 in a communication network such as the first network 1698 or the second network 1699 by using subscriber information (e.g., International Mobile Subscriber Identifier (IMSI)) stored in the subscriber identification module 1696.

The wireless communication module 1692 may support a 5G network after a fourth generation (4G) network and a next-generation communication technology, for example, a new radio (NR) access technology. The NR access technology may support high-speed transmission of high-capacity data (enhanced mobile broadband (eMBB)), minimization of terminal power and access of multiple terminals (massive machine type communications (mMTC)), or ultra-reliable and low-latency communications (URLLC). The wireless communication module 1692 may support, for example, a high frequency band (e.g., an mmWave band) to achieve a high data rate.

The wireless communication module 1692 may support various technologies for securing performance in a high frequency band, for example, technologies such as beam-forming, massive multiple-input and multiple-output (MIMO), full dimensional MIMO (FD-MIMO), array antenna, analog beam-forming, or large scale antenna. The wireless communication module 1692 may support various requirements prescribed in the electronic apparatus 1601, the external electronic apparatus (e.g., the electronic apparatus 1604), or the network system (e.g., the second network 1699). According to an embodiment of the disclosure, the wireless communication module 1692 may support a peak data rate (e.g., 20 Gbps or more) for realizing eMBB, a loss coverage (e.g., 164 dB or less) for realizing mMTC, or a U-plane latency (e.g., 0.5 ms or less in each of downlink (DL) and uplink (UL) or a round trip of 1 ms or less) for realizing URLLC.

The antenna module 1697 may transmit/receive a signal or power to/from the outside (e.g., the external electronic apparatus). According to an embodiment of the disclosure, the antenna module 1697 may include an antenna including a conductor formed on a substrate (e.g., a printed circuit board (PCB)) or a radiator including a conductive pattern. According to an embodiment of the disclosure, the antenna module 1697 may include a plurality of antennas (e.g., an array antenna). In this case, at least one antenna suitable for a communication scheme used in a communication network such as the first network 1698 or the second network 1699 may be selected from among the plurality of antennas by, for example, the communication module 1690. The signal or power may be transmitted or received between the communication module 1690 and the external electronic apparatus through the selected at least one antenna. According to some embodiments of the disclosure, other components (e.g., a radio frequency integrated circuit (RFIC)) other than the radiator may be additionally formed as a portion of the antenna module 1697.

According to various embodiments of the disclosure, the antenna module 1697 may form an mmWave antenna module. According to an embodiment of the disclosure, the mmWave antenna module may include a printed circuit board, an RFIC arranged on or adjacent to a first surface (e.g., bottom surface) of the printed circuit board and capable of supporting a designated high frequency band (e.g., a mmWave band), and a plurality of antennas (e.g., an array antenna) arranged on or adjacent to a second surface (e.g., top or side surface) of the printed circuit board and capable of transmitting or receiving signals of the designated high frequency band.

At least some of the above elements may be connected to each other through a communication scheme between peripheral devices (e.g., bus, general-purpose input and output (GPIO), serial peripheral interface (SPI), or mobile industry processor interface (MIPI)) and may exchange signals (e.g., command or data) with each other.

According to an embodiment of the disclosure, the command or data may be transmitted or received between the electronic apparatus 1601 and the external electronic apparatus 1604 through the server 1608 connected to the second network 1699. Each of the external electronic apparatuses 1602 and 1604 may be the same as or different from the electronic apparatus 1601.

According to an embodiment of the disclosure, all or some of the operations executed by the electronic apparatus 1601 may be executed by one or more external electronic apparatuses among the external electronic apparatuses 1602, 1604, and 1608. For example, when the electronic apparatus 1601 needs to perform a function or service automatically or in response to a request from the user or another device, the electronic apparatus 1601 may request one or more external electronic apparatuses to perform at least a portion of the function or service additionally or instead of executing the function or service by itself. One or more external electronic apparatuses that have received the request may execute at least a portion of the requested function or service or an additional function or service related to the request and transmit the execution result thereof to the electronic apparatus 1601. The electronic apparatus 1601 may process the execution result additionally or as it is and provide the processing result thereof as at least a portion of a response to the request. For this purpose, for example, cloud computing, distributed computing, mobile edge computing, or client-server computing technology may be used. The electronic apparatus 1601 may provide an ultra-low-latency service by using, for example, distributed computing or mobile edge computing. In another embodiment of the disclosure, the external electronic apparatus 1604 may include an Internet of things (IoT) device. The server 1608 may be an intelligent server using machine learning and/or neural networks. According to an embodiment of the disclosure, the external electronic apparatus 1604 or the server 1608 may be included in the second network 1699. The electronic apparatus 1601 may be applied to an intelligent service (e.g., smart home, smart city, smart car, or health care) based on 5G communication technology and IoT-related technology.

The electronic apparatus 1601 of FIG. 16 may correspond to the electronic apparatus 100, 100*a*, 100*b*, or 100*c* described above, the processor 1620 may correspond to the processor 210 described above, and the sensor module 1676 may correspond to the first sensor 220 or the second sensor 1110 described above, and the camera module 1680 may correspond to the camera module 110, 110*a*, or 110*b* described above.

Figure 17:
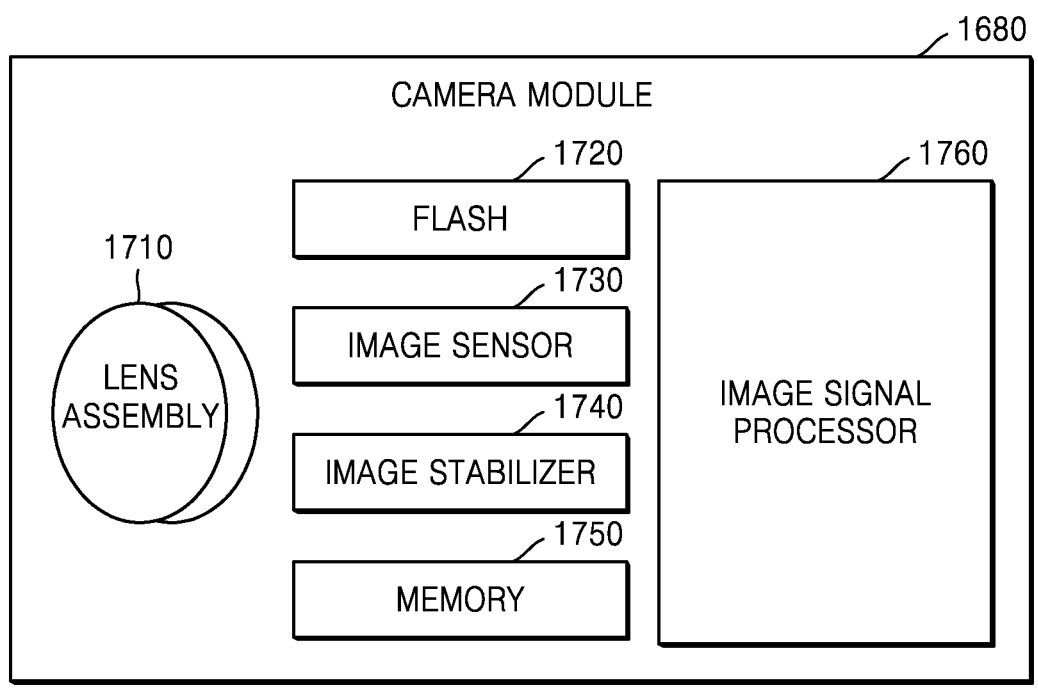
FIG. 17 is a block diagram illustrating a camera module according to an embodiment of the disclosure.

FIG. 17 is a block diagram illustrating a camera module according to an embodiment of the disclosure.

Referring to FIG. 17, a camera module 1680 may include a lens assembly 1710, a flash 1720, an image sensor 1730, an image stabilizer 1740, a memory 1750 (e.g., a buffer memory), or an image signal processor 1760.

The lens assembly 1710 may collect light emitted from an object whose image is to be captured. The lens assembly 1710 may include one or more lenses. According to an embodiment of the disclosure, the camera module 1680 may include a plurality of lens assemblies 1710. In this case, the camera module 1680 may form, for example, a dual camera, a 360 degree camera, or a spherical camera. Some of the plurality of lens assemblies 1710 may have the same lens properties (e.g., viewing angle, focal length, auto focus, f number, or optical zoom), or at least one lens assembly may have one or more lens properties that are different from the lens properties of other lens assemblies. The lens assembly 1710 may include, for example, a wide-angle lens or a telephoto lens.

The flash 1720 may emit light used to enhance light emitted or reflected from the object. According to an embodiment of the disclosure, the flash 1720 may include one or more light emitting diodes (LEDs) (e.g., a red-green-blue (RGB) LED, a white LED, an infrared LED, or an ultraviolet LED) or a xenon lamp.

The image sensor 1730 may obtain an image corresponding to the object by converting light emitted or reflected from the object and transmitted through the lens assembly 1710 into an electrical signal. According to an embodiment of the disclosure, the image sensor 1730 may include, for example, one image sensor selected from among image sensors (e.g., an RGB sensor, a black and white (BW) sensor, an infrared sensor (IR) sensor, or an ultraviolet (UV) sensor) having different properties, a plurality of image sensors having the same properties, or a plurality of image sensors having different properties. Each image sensor included in the image sensor 1730 may be implemented by using, for example, a charged coupled device (CCD) sensor or a complementary metal oxide semiconductor (CMOS) sensor.

The image stabilizer 1740 may move at least one lens or image sensor 1730 included in the lens assembly 1710 in a particular direction or control operation characteristics of the image sensor 1730 (e.g., adjustment of read-out timing), in response to the movement of the camera module 1680 or the electronic apparatus 1601 including the same. This may compensate for at least some of the adverse effects of the movement on the captured image. According to an embodiment of the disclosure, the image stabilizer 1740 may detect the movement of the camera module 1680 or the electronic apparatus 1601 by using a gyro sensor (not illustrated) or an acceleration sensor (not illustrated) arranged inside or outside the camera module 1680. According to an embodiment of the disclosure, the image stabilizer 1740 may be implemented as, for example, an optical image stabilizer.

The memory 1750 may temporarily store at least a portion of the image obtained through the image sensor 1730 for the next image processing operation. For example, when image obtainment is delayed according to the shutter or a plurality of images are obtained at high speed, an obtained original image (e.g., Bayer-patterned image or high-resolution image) may be stored in the memory 1750 and a copy image (e.g., a low-resolution image) corresponding thereto may be previewed through the display module 1660. Thereafter, when a designated condition is satisfied (e.g., a user input or a system command), at least a portion of the original image stored in the memory 1750 may be obtained and processed by, for example, the image signal processor 1760. According to an embodiment of the disclosure, as at least a portion of the memory 1630, the memory 1750 may be configured as a separate memory operated independently of the memory 1630.

The image signal processor 1760 may perform one or more image processings on the image obtained through the image sensor 1730 or on the image stored in the memory 1750. The one or more image processings may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the image signal processor 1760 may perform control (e.g., exposure time control or readout timing control) on at least one (e.g., the image sensor 1730) of the elements included in the camera module 1680.

The image processed by the image signal processor 1760 may be stored back in the memory 1750 for further processing or may be provided to the external element (e.g., the memory 1630, the display module 1660, the electronic apparatus 1602, the electronic apparatus 1604, or the server 1608) of the camera module 1680.

According to an embodiment of the disclosure, the image signal processor 1760 may be configured as at least a portion of the processor 1620 or as a separate processor operated independently of the processor 1620. When the image signal processor 1760 is configured as a separate processor from the processor 1620, at least one image processed by the image signal processor 1760 may be displayed through the display module 1660 as it is or after additional image processing by the processor 1620.

According to an embodiment of the disclosure, the electronic apparatus 1601 may include a plurality of camera modules 1680 having different properties or functions. In this case, for example, at least one of the plurality of camera modules 1680 may be a wide-angle camera, and at least another one may be a telephoto camera. Similarly, at least one of the plurality of camera modules 1680 may be a front camera, and at least another one may be a rear camera.

The lens assembly 1710 of FIG. 17 may correspond to the focus lens 112 described above, the image sensor 1730 may correspond to the imaging device 422 or image sensor 1330 described above, and the image stabilizer 1740 may correspond to a component for performing the first vibration correction described above with reference to FIG. 13. According to an embodiment of the disclosure, the image stabilizer 1740 may correspond to the OIS MCU for controlling both the first vibration correction and the second focusing operation described above with reference to FIG. 13.

Electronic apparatuses according to various embodiments of the disclosure may include various types of apparatuses. The electronic apparatuses may include, for example, portable communication apparatuses (e.g., smart phones), computer apparatuses, portable multimedia apparatuses, portable medical apparatuses, cameras, wearable apparatuses, or home appliances. The electronic apparatuses according to embodiments of the disclosure are not limited to the above apparatuses.

Various embodiments of the disclosure and terms used herein are not intended to limit the technical features described herein to particular embodiments, and the disclosure should be understood as including various modifications, equivalents, or alternatives of the embodiments of the disclosure. Throughout the disclosure and drawings, like reference numerals may be used to denote like or relevant elements. As used herein, each of the phrases "A or B," "at least one of A and B," "at least one of A or B," "A, B, or C," "at least one of A, B, and C," and "at least one of A, B, or C" may include any one of the items listed together in the phrase or any combinations thereof. Terms such as "first" and "second" may be merely used to distinguish an element from another element and are not intended to limit the elements in other aspects (e.g., importance or order). When a certain (e.g., first) element is referred to as being "coupled" or "connected" to another (e.g., second) element with or without the term "functionally" or "communicatively," it may mean that the certain element may be connected to the other element directly (e.g., by wire), wirelessly, or through a third element.

The term "module" used herein may include a unit implemented as hardware, software, or firmware and may be interchangeable with, for example, terms such as "logic," "logical block," "component," or "circuit." The "module" may be an integrated component or a portion or a minimum unit of the integrated component that performs one or more functions. For example, according to an embodiment of the disclosure, the module may be implemented in the form of an application-specific integrated circuit (ASIC).

Various embodiments of the disclosure may be implemented as software (e.g., the program 1640) including one or more instructions stored in a storage medium (e.g., an internal memory 1636 or an external memory 1638) readable by a machine (e.g., the electronic apparatus 1601). For example, the machine (e.g., a processor (e.g., the processor 1620) of the electronic apparatus 1601) may call and execute at least one of one or more stored instructions from the storage medium. This may allow the machine to be operated to perform at least one function according to the called at least one instruction. The one or more instructions may include code generated by a compiler or code executable by an interpreter. The machine-readable storage medium may be provided in the form of a non-transitory storage medium. Here, the term "non-transitory" may merely mean that the storage medium is a tangible apparatus and does not include signals (e.g., electromagnetic waves) and may mean that data may be permanently or temporarily stored in the storage medium.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store (e.g., Play Store™) or directly between two user apparatuses (smart phones). In the case of online distribution, at least a portion of the computer program product may be at least temporarily stored or temporarily generated in a machine-readable storage medium such as a manufacturer's server, a server of an application store, or a memory of a relay server.

According to embodiments of the disclosure, it may be possible to provide an electronic apparatus capable of improving a photographing quality in close-up photographing, a control method of the electronic apparatus, and a computer-readable recording medium storing a program thereof.

Also, according to embodiments of the disclosure, it may be possible to provide an electronic apparatus capable of correcting a hand vibration in an optical-axis direction by tracking a motion in the optical-axis direction of the electronic apparatus, a control method of the electronic apparatus, and a computer-readable recording medium storing a program thereof.

According to various embodiments of the disclosure, each element (e.g., module or program) of the above elements may include a single entity or a plurality of entities, and some of the plurality of entities may be separately arranged in another element. According to various embodiments of the disclosure, one or more elements or operations among the above elements may be omitted or one or more other elements or operations may be added. Alternatively or additionally, a plurality of elements (e.g., modules or programs) may be integrated into one element. In this case, the integrated element may perform one or more functions of each element of the plurality of elements in the same or similar manner as those performed by the corresponding element among the plurality of elements prior to the integration. According to various embodiments of the disclosure, operations performed by modules, programs, or other elements may be executed sequentially, in parallel, iteratively, or heuristically; one or more of the operations may be executed in different order or omitted; or one or more other operations may be added therein.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic apparatus comprising:
   at least one camera comprising at least one lens;
   a first sensor configured to detect a motion of the electronic apparatus; and
   at least one processor configured to:
   perform a first focusing operation comprising: determining a target position of the at least one lens by focusing processing on a subject and moving the at least one lens to the target position,
   perform a second focusing operation comprising, according to a determination that a first condition that a photographing distance, which is a distance to the subject, is less than a distance reference value and a depth-of-field value is less than or equal to a depth reference value is satisfied:
   calculating a motion value in an optical-axis direction from a detection value of the first sensor,
   calculating a focusing correction value for compensating for the motion value in the optical-axis direction, and
   additionally driving the at least one lens based on the focusing correction value,
   operate in a first mode of activating the second focusing operation, based on the determination that the first condition is satisfied, and
   operate in a second mode of not performing the second focusing operation, based on a determination that the first condition is not satisfied.

2. The electronic apparatus of claim 1, wherein a drivable range of the at least one lens by the second focusing operation is narrower than a drivable range of the at least one lens by the first focusing operation.

3. The electronic apparatus of claim 1, wherein the at least one processor is further configured to measure the photographing distance to the subject based on image data generated by the at least one camera.

4. The electronic apparatus of claim 1, further comprising:
   a second sensor configured to measure a distance to the subject, wherein the at least one processor is further configured to measure the distance to the subject based on a detection value of the second sensor.

5. The electronic apparatus of claim 1,
wherein the at least one camera comprises a wide-angle camera and a telephoto camera comprising a lens with a greater focal length than the wide-angle camera, and
wherein the at least one processor is further configured to:
in response to the wide-angle camera being used, determine whether the first condition is satisfied, and
perform the second focusing operation based on the determination that the first condition is satisfied.

6. The electronic apparatus of claim 1,
wherein the at least one camera comprises at least one vibration correction lens and at least one focus lens for adjusting a focal length, and
wherein the at least one processor is further configured to:
detect a motion in an angular-speed direction from the first sensor and drive the at least one vibration correction lens to compensate for a motion value in the angular-speed direction, and
drive the at least one focus lens by performing the first focusing operation and the second focusing operation.

7. The electronic apparatus of claim 1, wherein the at least one processor is further configured to:
detect a motion in an angular-speed direction from the first sensor; and
perform hand vibration correction processing on an image generated by the at least one camera to compensate for a motion value in the angular-speed direction.

8. The electronic apparatus of claim 1,
wherein the at least one processor comprises:
a first processor configured to perform the first focusing operation, and
a second processor configured to perform the second focusing operation, and
wherein the at least one processor is further configured to:
determine whether the first condition is satisfied, and
activate the second focusing operation of the second processor based on a determination that the first condition is satisfied.

9. The electronic apparatus of claim 8,
wherein the first sensor comprises a 6-axis acceleration sensor, and
wherein the second processor is further configured to:
calculate the motion value in the optical-axis direction by quadratically integrating an acceleration value in the optical-axis direction among detection values of the first sensor,
calculate the focusing correction value to compensate for the motion value in the optical-axis direction, and
perform the second focusing operation.

10. The electronic apparatus of claim 1, wherein the distance reference value is 100 mm and the depth reference value is 8 mm.

11. The electronic apparatus of claim 1, wherein the at least one processor is further configured to:
complete the first focusing operation before an exposure period after inputting a shutter release signal of the at least one camera; and
perform the second focusing operation during the exposure period.

12. The electronic apparatus of claim 1,
wherein the electronic apparatus further comprises optical image stabilization micro controller unit (OIS MCU).

13. The electronic apparatus of claim 12,
wherein the OIS MCU is configured to track a motion value in a z-axis direction during a period of generating a preview image and an exposure period after a shutter release signal is input.

14. A control method of an electronic apparatus comprising at least one camera, the control method comprising:
detecting a motion of the electronic apparatus by using a first sensor;
performing a first focusing operation comprising determining a target position of at least one lens by focusing processing on a subject and moving the at least one lens to the target position;
performing a second focusing operation comprising, according to a determination that a first condition that a photographing distance, which is a distance to the subject, is less than a distance reference value and a depth-of-field value is less than or equal to a depth reference value is satisfied:
calculating a motion value in an optical-axis direction from a detection value of the first sensor,
calculating a focusing correction value for compensating for the motion value in the optical-axis direction, and
additionally driving the at least one lens based on the focusing correction value;
operating in a first mode of activating the second focusing operation, based on the determination that the first condition is satisfied; and
operating in a second mode of not performing the second focusing operation, based on a determination that the first condition is not satisfied.

15. The control method of claim 14, wherein a drivable range of the at least one lens by the second focusing operation is narrower than a drivable range of the at least one lens by the first focusing operation.

16. The control method of claim 14, further comprising measuring a distance to the subject based on image data generated by the at least one camera.

17. The control method of claim 14, further comprising measuring a distance to the subject based on a detection value of a second sensor configured to measure the distance to the subject.

18. A non-transitory computer-readable recording medium having recorded thereon a program for performing the control method of claim 14 in a computer.